United States Patent [19]

Imai et al.

[54] THERMOPLASTIC ELASTOMER COMPOSITION

[75] Inventors: Takateru Imai; Masanobu Nagano, both of Yokkaichi; Masaaki Mawatari, Suzuka; Toshio Teramoto, Yokkaichi; Minoru Hasegawa, Suzuka, all of Japan

[73] Assignee: Japan Synthetic Rubber Co., Ltd., Tokyo, Japan

[21] Appl. No.: 552,303

[22] Filed: Jul. 13, 1990

[30] Foreign Application Priority Data

Jul. 17, 1989 [JP] Japan .................. 1-182612
Aug. 15, 1989 [JP] Japan .................. 1-209608

[51] Int. Cl.$^5$ .............. C08L 53/02; C08L 51/04; C08L 77/06; C08L 67/02
[52] U.S. Cl. ...................... 525/066; 525/71; 525/89; 525/93; 525/98; 525/314; 524/525; 524/526; 524/531; 524/555; 524/504; 524/505
[58] Field of Search ........... 525/66, 71, 93, 98, 525/314, 89; 524/525, 526, 531, 555, 504, 505

[56] References Cited

U.S. PATENT DOCUMENTS

| | | | |
|---|---|---|---|
| 3,634,549 | 1/1972 | Shaw et al. | 525/314 |
| 4,107,236 | 8/1978 | Naylor et al. | |
| 4,237,245 | 12/1980 | Halson et al. | |
| 4,436,873 | 3/1984 | Furukawa et al. | 525/314 |
| 4,835,215 | 5/1989 | Sakano et al. | 525/71 |
| 4,849,473 | 7/1989 | Cigna et al. | 525/71 |
| 4,902,749 | 2/1990 | Akkapeddi et al. | 525/71 |
| 4,994,508 | 2/1991 | Shiraki et al. | 525/71 |
| 5,013,790 | 5/1991 | Tung et al. | 525/71 |

FOREIGN PATENT DOCUMENTS

| | | |
|---|---|---|
| 0026292 | 4/1981 | European Pat. Off. |
| 0211467 | 2/1987 | European Pat. Off. |
| 0270927 | 6/1988 | European Pat. Off. |

OTHER PUBLICATIONS

World Patents Index Latest, 87-182215, and JP-A-6-2-112-640, May 23, 1987.

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

A thermoplastic elastomer composition comprising 99-1 parts by weight of (i) a hydrogenated diene polymer which is a hydrogenation product of a straight or branched chain block copolymer consisting of (C) a polybutadiene block segment having a 1,2-vinyl content of not more than 20% and (D) a block segment which is a polybutadiene or an alkenyl aromatic compound-butadiene copolymer, the butadiene portion of which has a 1,2-vinyl content of 25-95% and 1-99 parts by weight of (ii) at least one of a thermoplastic resin or a rubbery polymer.

8 Claims, No Drawings

THERMOPLASTIC ELASTOMER COMPOSITION

This invention relates to a thermoplastic elastomer composition useful as interior or exterior parts of automobiles and various industrial parts. More particularly, this invention relates to a thermoplastic elastomer composition comprising a thermoplastic elastomer showing excellent rubber-like properties and a crystalline thermoplastic polymer, which has properties comparable to vulcanized rubbers.

A hydrogenated block copolymer is known which is obtained by hydrogenating the butadiene portions of a block copolymer consisting of a polybutadiene segment of low 1,2-vinyl content and a polybutadiene segment of high 1,2-vinyl content [John Carl Falk and R. J. Schlott, Macromolecules, 4, 152 (1971); Morton et al., ACS Symp. Ser., 193, 101-18 (1982)]. It is also known that this hydrogenated block copolymer is a thermoplastic elastomer showing excellent elasticity at room temperature.

The above block copolymer is structurally regarded as consisting of a polyethylene (PE) and an ethylene-butene copolymer rubber (EB).

However, the thermoplastic elastomer consisting of this block copolymer (hereinafter referred to as "E-EB type TPE") has drawbacks, for example, sharp reduction in dynamic strength at high temperatures and the like and finds no practical application yet in industry.

It is also known that the hydrogenated block copolymer obtained by hydrogenating the polybutadiene portion of a polystyrene-polybutadiene-polystyrene block copolymer (the hydrogenated block copolymer is hereinafter referred to as "SEBS") is a thermoplastic elastomer showing excellent elasticity at room temperature, similarly to E-EB type TPE.

A composition consisting of a polypropylene, SEBS and a softening agent in which the excellent rubbery properties inherent in SEBS are utilized has excellent elastomer properties and is used in industry. This composition, however, has insufficient compression set at high temperatures; and when containing a large amount of a softening agent to allow the composition to have a low hardness, the composition has slight stickiness at the surface. Therefore, improvements in these properties have been desired.

This invention aims at solving the above-mentioned technical problems of the prior art, eliminating the drawbacks of E-EB type TPE which is intrinsically an excellent thermoplastic elastomer, and thereby providing an industrially useful material.

This invention provides a thermoplastic elastomer composition [hereinafter referred to "Elastomer Composition (I)" in some cases] comprising (i) 99-1% by weight of a hydrogenated diene polymer [hereinafter referred to as "Component (i)" or "Hydrogenated Diene Polymer"] which is a hydrogenation product of a straight or branched chain block copolymer (hereinafter referred to simply as "Block Copolymer") consisting of (C) a polybutadiene block segment (hereinafter referred to as "Block C") having a 1,2-vinyl content of not more than 20% and (D) a block segment (hereinafter referred to as "Block D") which is a polybutadiene or an alkenyl aromatic compound-butadiene copolymer, the butadiene portion of which has a 1,2-vinyl content of 25-95%, the block structure of said straight or branched chain block copolymer being represented by the formula, $C-(D-C)_n$ or $(C-D)_m$ in which C means the above-mentioned Block C, D means the above-mentioned Block D, n means an integer of 1 or more and m means an integer of 2 or more, at least 90% of the double bond in the butadiene portion of the straight or branched chain block copolymer having been hydrogenated, and (ii) 1-99% by weight of a thermoplastic resin, or a rubbery polymer, or both of them [hereinafter referred to as "Component (ii)" or "Thermoplastic Resin and/or Rubbery Polymer"].

This invention also provides a modified hydrogenated block polymer [hereinafter referred to as "Component (i')" or "Modified Hydrogenated Diene Polymer"] obtained by adding to the hydrogenated diene polymer [Component (i)], 0.01-10 mole % of at least one functional group selected from the group consisting of carboxyl group, acid anhydride group, hydroxyl group, epoxy group, halogen atoms, amino group, isocyanate group and sulfonate group, as well as a thermoplastic elastomer composition consisting of Component (i,) and Component (ii).

This invention also provides a thermoplastic elastomer composition [hereinafter referred to as "Elastomer Composition (II)" in some cases] obtained by subjecting a mixture of Component (i) or (i'), a rubbery polymer as Component (ii) and a crosslinking agent for the rubbery polymer to reaction while applying shear deformation to the mixture, to allow at least 10% by weight of the rubbery polymer to gel.

This invention also provides a thermoplastic elastomer composition [hereinafter referred to as "Elastomer Composition (III)" in some cases] obtained by subjecting Component (i) or (i') and Component (ii) comprising at least 10% by weight of a thermoplastic resin to reaction in the presence of a crosslinking agent while applying shear deformation, to allow at least 10% by weight of the total amount of Component (i) or (i') and the rubbery polymer to gel.

This invention also provides a thermoplastic elastomer composition [hereinafter referred to as "Elastomer Composition (IV)" in some cases] comprising 10-90 parts by weight of Component (i) or (i'), 90-10 parts by weight of (ii) a polyolefin resin, and 1-300 parts by weight, per 100 parts by weight of the total of Component (i) or (i') and the (ii) component, of (iii) a non-aromatic process oil.

This invention also provides a thermoplastic elastomer composition [hereinafter referred to as "Elastomer Composition (V)" in some cases] obtained by subjecting Elastomer Composition (IV) to reaction in the presence of a crosslinking agent for Component (i) or (i') while applying shear deformation, to allow at least 10% by weight of Component (i) or (i') to gel.

This invention also provides a thermoplastic elastomer composition [hereinafter referred to as "Elastomer Composition (VI)" in some cases] comprising 5-95 parts by weight of Component (i) or (i'), 95-5 parts by weight of (ii) a mixture of 10-90% by weight of a polyolefin resin and 90-10% by weight of an olefin copolymer rubber, and 1-400 parts by weight, per 100 parts by weight of the total of Component (i) or (i') and the (ii) component, of (iii) a non-aromatic process oil.

This invention also provides a thermoplastic elastomer composition [hereinafter referred to as "Elastomer Composition (VII)" in some cases] obtained by subjecting Elastomer Component (VI) to reaction in the presence of a crosslinking agent for crosslinking the olefin copolymer rubber in the (ii) component, while applying shear deformation, to allow at least 10% by weight of the olefin copolymer rubber to gel.

This invention also provides a thermoplastic elastomer composition [hereinafter referred to as "Elastomer Composition (VIII)" in some cases] comprising 5-95 parts by weight of Component (i) or (i'), 95-5 parts by weight of (ii) a mixture of (A) an olefin polymer having copolymerized therewith or grafted thereon a carboxylic acid derivative or an epoxy derivative or both of them, or said polymer having bonded thereto other polymer in a graft or block form, and (B) at least one polymer selected from the group consisting of polyamide polymers and polyester polymers [in the (ii) component, the amount of the (A) component is not more than 50% by weight], and 0-400 parts by weight, per 100 parts by weight of the total amount of Component (i) or (i') and the (ii) component, of (iii) a softening agent.

Component (i), Hydrogenated Diene Polymer used in this invention can be obtained by hydrogenating a straight or branched chain block copolymer consisting of a polybutadiene block segment [Block C] having a 1,2-vinyl content of not more than 20% and a block segment [Block D] which is a polybutadiene or an alkenyl aromatic compound-butadiene copolymer, the butadiene portion of which has a 1,2-vinyl content of 25-95%, the block structure of said straight or branched chain block copolymer being represented by C-(D-C)$_n$ or (C-D)$_m$ (C, D, n and m have the same meanings as defined above).

Block C in Component (i) or (i'), when hydrogenated, becomes a crystalline block segment having a structure similar to ordinary low density polyethylene (LDPE).

The 1,2-vinyl content in Block C is usually not more than 20%, preferably not more than 18%, more preferably not more than 15%.

When the 1,2-vinyl content in Block C is more than 20%, reduction in crystal melting point after hydrogenation is striking and Component (i) or (i') has poor dynamic properties.

Block D is a polybutadiene or an alkenyl aromatic compound-butadiene copolymer and, when hydrogenated, becomes a block segment having a structure similar to a rubbery ethylene-butene copolymer or alkenyl aromatic compound-ethylene-butene copolymer.

The alkenyl aromatic compound used in Block D includes styrene, tert-butylstyrene, α-methylstyrene, p-methylstyrene, divinylbenzene, 1,1-diphenylstyrene, N,N-dimethyl-p-aminoethylstyrene, N,N-diethyl-p-aminoethylstyrene, vinylpyridine, etc. Of them, styrene and α-methylstyrene are particularly preferable. The amount of the alkenyl aromatic compound used is not more than 35% by weight, preferably not more than 30% by weight, more preferably not more than 25% by weight based on the total weight of the monomers constituting Block D. When the amount is more than 35% by weight, the glass transition temperature of Block D gets higher and Component (i) or (i') has poor dynamic properties.

The 1,2-vinyl content of the butadiene portion in Block D is usually 25-95%, preferably 25-90%, more preferably 25-80%, particularly preferably 25-70%. In each case where the content is less than 25% or more than 95%, the resulting hydrogenated diene polymer shows a crystalline structure based on a polyethylene chain or a polybutene-1 chain, has resinous properties, and accordingly has inferior dynamic properties.

The proportions of Block C and Block D in Component (i) or (i') are such that usually Block C is 5-90% by weight and Block D is 95-10% by weight, and preferably Block C is 10-85% by weight and Block D is 90-15% by weight. When Block C is less than 5% by weight and Block D is more than 95% by weight, the amount of crystalline block segment is insufficient and Component (i) or (i') has poor dynamic properties, which is not preferable. When Block C is more than 90% by weight and Block D is less than 10% by weight, Component (i) or (i') has a high hardness and the resulting composition is unsuited as a thermoplastic elastomer.

In both Hydrogenated Diene Polymer and Modified Hydrogenated Diene Polymer used in this invention, it is necessary that at least 90%, preferably 95-100% of the double bond in the butadiene portion of Block C and Block D have been hydrogenated. When less than 90% of the double bond has been hydrogenated, heat resistance, weather resistance and ozone resistance are poor.

Block C and Block D both have a weight-average molecular weight of usually 5,000 or more, preferably 10,000 or more, more preferably 15,000 or more. When the molecular weight is less than 5,000, Component (i) or (i') has poor dynamic properties.

Block Copolymer consisting of Block C and Block D has a polystyrene-reduced weight-average molecular weight of 30,000-600,000, preferably 50,000-550,000, more preferably 70,000-500,000. When the molecular weight is less than 30,000, dynamic properties are insufficient and, when the molecular weight is more than 600,000, hydrogenation reaction is difficult.

Hydrogenated Diene Polymer or Modified Hydrogenated Diene Polymer of this invention can be obtained by forming Block C and Block D by living anionic polymerization in an organic solvent using an organic alkali metal compound as an initiator to obtain a block copolymer and then hydrogenating the block copolymer.

The organic solvent includes hydrocarbon solvents such as pentane, hexane, heptane, octane, methylcyclopentane, cyclohexane, benzene, xylene and the like.

The organic alkali metal compound as an initiator is preferably an organolithium compound.

The organolithium compound is an organomonolithium compound, an organodilithium compound or an organopolylithium compound. Specific examples of these include ethyllithium, n-propyllithium, isopropyllithium, n-butyllithium, sec-butyllithium, tert-butyllithium, hexamethylenedilithium, butadienyllithium and isoprenyldilithium. The organolithium compound is used in an amount of 0.02-0.2 part by weight per 100 parts by weight of the monomers.

In the living anionic polymerization, a Lewis base (e.g. ether, amine) can be used as an agent for controlling the microstructure, i.e. controlling the vinyl content of conjugated diene portion. The ether specifically includes diethyl ether; tetrahydrofuran; propyl ether; butyl ether; higher ethers; and ether derivatives of polyethylene glycols, such as ethylene glycol dibutyl ether, diethylene glycol diemthyl ether, diethylene glycol dibutyl ether, triethylene glycol dimethyl ether and the like. The amine includes tetramethylethylenediamine, pyridine, tertiary amines (e.g. tributylamine), etc. The Lewis base is used together with the above-mentioned organic solvent.

The polymerization reaction is effected usually at $-30°$ C. to $+150°$ C. The living anionic polymerization can be effected by controlling the system temperature to a given temperature, or allowing the temperature to rise without removing the heat generated.

Block Copolymer can be produced by any method. In general, however, first Block C is formed by polymerization in the above-mentioned organic solvent in the presence of a polymerization initiator such as alkali metal compound or the like; subsequently, Block D is formed by polymerization.

The thus formed Block Copolymer is reacted with a coupling agent, whereby Block Copolymer having an extended or branched molecular chain represented by the following general formula can be obtained:

$$C\text{-}(C\text{-}C)_n$$

or $$(C\text{-}D)_m$$

wherein C and D have the same meanings as defined above, n is an integer of 1 or more, and m is an integer or 2 or more, preferably 2–4.

The coupling agent includes, for example, diethyl adipate, divinylbenzene, tetrachlorosilicon, butyltrichlorosilicon, tetrachlorotin, butyltrichlorotin, dimethyldichlorosilicon, methyldichlorosilane, tetrachlorogermanium, 1,2-dibromoethane, 1,4-chloromethylbenzene, bis(trichlorosilyl)ethane, epoxidized linseed oil, tolylene diisocyanate and 1,2,4-benzenetriisocyanate.

The alkenyl aromatic compound content in Block Copolymer can be controlled by the amount of monomer(s) fed in each polymerization stage, and the vinyl content in the conjugated diene portion can be controlled by the amount of the microstructure-controlling agent. The number-average molecular weight of Block Copolymer can be controlled by the amount of polymerization initiator (e.g. n-butyllithium) to be added.

The process for producing Block Copolymer used in this invention is described more specifically below. Block Copolymer can be obtained, for example, as follows: 1,3-Butadiene for first-stage polymerization is polymerized in a polymerization solvent, i.e. an organic solvent (e.g. benzene or cyclohexane) in the presence of an initiator, i.e. an organolithium compound (e.g. sec-butyllithium) in a high-purity nitrogen current to form a low-vinyl polybutadiene block (Block C); subsequently, a microstructure-controlling agent (e.g. tetrahydrofuran or diethyl ether) and 1,3-butadiene for second-stage polymerization are added and subjected to polymerization to form a C-D diblock polymer; then, a coupling agent such as dimethyldichlorosilane or the like is added in a given amount to subject the C-D diblock polymer to coupling to obtain a C-D-C triblock polymer.

When there is used a multifunctional coupling agent, there can be obtained a branched chain multiblock polymer having branches of a plurality of C-D blocks.

The molecular weight of Block C can be determined by, at the completion of the first-stage polymerization, taking an appropriate amount of a sample of the polymerization mixture and subjecting it to gel permeation chromatography (GPC). Similarly, the molecular weight of the polymer after the second-stage polymerization can be determined by, at the completion of the second-stage polymerization, taking an appropriate amount of a sample of the polymerization mixture and subjecting it to GPC. By subtracting the molecular weight of Block C from the molecular weight of polymer after the second-stage polymerization, there can be determined the molecular weight of the polymer formed in the second-stage polymerization. Therefore, the molecular weight of Block D in the C-D-C triblock polymer becomes two times the molecular weight of the polymer formed in the second-stage polymerization.

By hydrogenating the thus obtained Block Copolymer, there can be obtained Hydrogenated Diene Polymer used in this invention.

The above hydrogenation is effected by subjecting Block Copolymer to hydrogenation in an inert solvent in the presence of a hydrogenation catalyst at 20°–150° C. at a hydrogen pressure of 1–100 kg/cm$^2$.

The inert solvent used in the hydrogenation includes hydrocarbon solvents such as hexane, heptane, cyclohexane, benzene, toluene, ethylbenzene and the like; and polar solvents such as methyl ethyl ketone, ethyl acetate, diethyl ether, tetrahydrofuran and the like.

The hydrogenation catalyst includes catalysts consisting of a noble metal (e.g. palladium, ruthenium, rhodium, platinum or the like) supported on carbon, silica, diatomaceous earth or the like; catalysts consisting of a complex or rhodium, ruthenium, platinum or the like; catalysts consisting of (1) a salt of an organic carboxylic acid with nickel, cobalt or the like and (2) an organoaluminum or an organolithium; hydrogenation catalysts consisting of (1) a bis(cyclopentadienyl) group-containing transition metal compound and (2) a reducing organometal compound such as organoaluminum, organolithium, organomagnesium or the like; and so forth.

Hydrogenated Diene Polymer of this invention can also be produced by effecting a hydrogenation reaction using a reducing compound (e.g. lithium aluminum hydride, p-toluenesulfonyl hydrazide or the like), a hydrogen storage alloy (e.g. Zr-Ti-Fe-V-Cr alloy, Zr-Ti-Nb-Fe-V-Cr alloy, LaNi$_5$ or the like) or the like.

The hydrogenation degree of the double bonds of the butadiene portion in Hydrogenated Diene Polymer of this invention can be controlled by changing the kind of the hydrogenation catalyst, the amount of the reducing compound added, the hydrogen pressure in hydrogenation reaction and the reaction time.

The catalyst residue is removed from the solution containing Hydrogenated Diene Polymer; a phenol type or amine type antioxidant is added; and from the resulting polymer solution can be easily isolated Hydrogenated Diene Polymer.

The isolation of Hydrogenated Diene Polymer can be effected, for example, by adding acetone, an alcohol or the like to the polymer solution to precipitate the polymer, or by pouring the polymer solution into boiling water with stirring to remove the solvent by vaporization.

Modified Hydrogenated Diene Polymer of this invention can be formed by adding to the above produced Hydrogenated Diene Polymer 0.01–10 mole % of at least one functional group selected from the group consisting of carboxyl group, acid anhydride group, hydroxyl group, epoxy group, halogen atoms, amino group, isocyanate group, sulfonyl group and sulfonate group.

The method for adding the functional group includes, for example:

(1) a method comprising copolymerizing a conjugated diene and an alkenyl aromatic compound having a functional group in a state that the functional group is protected, to obtain a block copolymer and removing the protective group after the completion of the copolymerization.

(2) a method comprising adding a radical-polymerizable monomer having a functional group to Hydrogenated Diene Polymer by a known graft reaction, and (3) a method comprising kneading Hydrogenated Diene Polymer in the presence of a functional group-containing organic peroxide or azo compound to effect the addition of the functional group to Hydrogenated Diene Polymer.

Any of these methods can effectively introduce a functional group into Hydrogenated Diene Polymer. However, the method (2) or (3) is simple and effective in industrial application.

Modified Hydrogenated Diene Polymer of this invention can be specifically obtained, for example, by melt-mixing, with heating, Hydrogenated Diene Polymer and a functional group-containing radical-polymerizable monomer in the presence of a radical-generating agent (e.g. organic peroxide), or by melt-mixing, with heating, Hydrogenated Diene Polymer in the presence of a functional group-containing organic peroxide or azo compound to add an appropriate amount of the functional group to Hydrogenated Diene Polymer.

The amount of the functional group in Modified Hydrogenated Diene Polymer is usually 0.01–10 mole %, preferably 0.1–8 mole %, more preferably 0.15–5 mole % based on the molecule constituting Hydrogenated Diene Polymer. When the amount is less than 0.01 mole %, the compatibility is not improved, phase separation takes place, and mechanical strengths are poor. When the amount is more than 10 mole %, no further improvements in compatibility, etc. are obtained, and side reactions such as gelation and the like tend to occur during the functional group addition reaction, i.e. the grafting reaction.

The monomer to be added to Hydrogenated Diene Polymer includes the followings.

The carboxyl group-containing monomer includes unsaturated carboxylic acids (e.g. acrylic acid, methacrylic acid, crotonic acid, maleic acid, fumaric acid, itaconic acid), etc. and, besides, compounds represented by general formula (I), etc.:

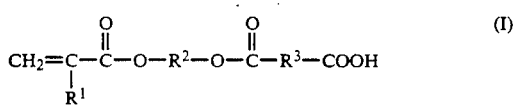

where $R^1$ represents a hydrogen atom or a methyl group, $R^2$ represents an alkylene group of 2–6 carbon atoms, $R^3$ represents a phenylene group, a cyclohexylene group, an alkylene group of 2–6 carbon atoms or an unsaturated hydrocarbon group.

The acid anhydride group-containing monomer includes acid anhydride compounds such as maleic anhydride, itaconic anhydride, citraconic anhydride and the like.

The hydroxyl group-containing monomer includes hydroxyl group-containing alkenyl compounds represented by general formula (II):

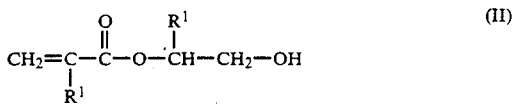

wherein $R^1$ has the same meaning as above, and $R^2$ represents a hydrogen atom or an alkyl group of 1–6 carbon atoms.

The epoxy group-containing monomer includes epoxy group-containing alkenyl compounds represented by the following general formula (III) or (IV):

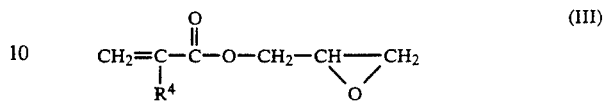

($R^4$ represents a hydrogen atom, a methyl group or a lower alkyl group substituted with a glycidyl ester group),

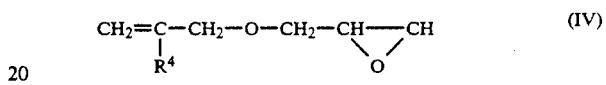

($R^4$ has the same meaning as defined above).

The halogen atom(s)-containing monomer includes, for example, halogenated aromatic vinyl compounds such as chlorostyrene, bromostyrene and the like; and halogenated (meth)acrylates such as 2,4,6-tribromophenyl methacrylate, 2,4,6-trichlorophenyl methacrylate, methyl 2-chloroacrylate, ethyl 2-chloroacrylate, n-butyl 2-chloroacrylate and the like.

The amino group-containing monomer includes, for example, amino group- or substituted amino group-containing alkenyl monomers represented by general formula (V):

wherein $R^5$ represents a hydrogen atom, a methyl group or an ethyl group, and $R^6$ represents an alkyl group of 1–12 carbon atoms, an alkanoyl group of 2–12 carbon atoms, a phenyl group of 6–12 carbon atoms, a cycloalkyl group or a derivative thereof.

Specific examples of the amino group-containing monomer are aminoalkyl esters of acrylic acid or methacrylic acid, such as aminoethyl acrylate, propylaminoethyl acrylate, dimethylaminoethyl methacrylate, ethylaminopropyl methacrylate, phenylaminoethyl methacrylate, cyclohexylaminoethyl methacrylate and the like; vinylamines such as N-vinyldiethylamine, N-acetylvinylamine and the like; allylamines such as allylamine, methallylamine, N-methylallylamine and the like; (meth)acrylamides such as acrylamide, methacrylamide, N-methylacrylamide and the like; and aminostyrenes such as p-aminostyrene and the like.

Preferable examples of the functional group-containing monomer are acrylic acid, methacrylic acid, itaconic acid, maleic acid, maleic anhydride, glycidyl acrylate, glycidyl methacrylate, allyl glycidyl ether, hydroxyethylene methacrylate, hydroxypropyl methacrylate, hydroxyethyl acrylate, hydroxypropyl acrylate, and diethylaminoethyl methacrylate.

The functional group-containing monomer further includes, as preferable examples, substituted arylmaleimide compounds represented by general formula (VI):

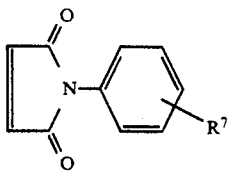

(VI)

wherein $R^7$ is a functional group selected from the group consisting of —OH, —OCH$_3$, —Cl, —COOH and —NO$_2$ and is bonded to the o-, m- or p-position of benzene ring.

Preferable examples of the substituted arylmaleimide compound are N-(o-carboxyphenyl)maleimide, N-(p-carboxyphenylmaleimide), N-(p-chlorophenyl)maleimide, N-(m-hydroxyphenylmaleimide) and N-(p-hydroxyphenyl)maleimide.

The functional group-containing organic peroxide, when decomposed, generates a free radical containing a functional group such as carboxyl group, halogen atom, hydroxyl group, epoxy group or the like, and includes, for example, 2,4-dichlorobenzoyl peroxide, p-chlorobenzoyl peroxide, succinic acid peroxide, tertbutyl peroxymaleic acid, cyclohexanone peroxide, methylcyclohexanone peroxide, and tert-butyl peroxyglycidyl ether.

The functional group-containing azo compound includes, for example, 4,4'-azobis-4-cyanovaleric acid, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)-propionamide], and 2,2'-azobis[2-(hydroxymethyl)propionitrile].

The functional group-containing organic peroxide or azo compound to be used for addition of functional group to Hydrogenated Diene Polymer must be able to effectively generate a free radical at the temperature at which Hydrogenated Diene Polymer to be subjected to functional group addition is melted. Some of the functional group-containing organic peroxides or azo compounds are instable to heat or are decomposed at high temperatures; accordingly, such peroxides or azo compounds cannot be used when Hydrogenated Diene Polymer is melted at a high temperature, that is, when the content of Component (A) in Hydrogenated Diene Polymer is high. For example, 4,4'-azobis-4-cyanovaleric acid is decomposed at 110°–120° C. and is not suitable for the modification of Hydrogenated Diene Polymer of high melting temperature.

The thermoplastic resin used as Component (ii) in this invention refers to all resins which can be melted by heating and molded into any desired shape. Specific examples of the thermoplastic resin include olefin resins such as polyethylene, polypropylene, polybutene-1, polymethylpentene, ethylene-vinyl acetate copolymer and the like; modification products of these olefin resins with carboxylic acid derivatives or epoxy derivatives; polyamide resins such as nylon 4,6, nylon 6, nylon 6,6 and the like; polyester resins such as poly(ethylene terephthalate), poly(butylene terephthalate) and the like; crystalline thermoplastic resins such as polyamide elastomer, polyester elastomer and the like; hydrogenation products of ring-opening polymers of norbornene derivatives, disclosed in, for example, Japanese Patent Application Kokai No. 01-240517 and Japanese Patent Application Kokai No. 01-32625; polymers for rubber modification such as ABS resin, AES resin, AAS resin, MBS resin and the like; noncrystalline thermoplastic polymers such as acrylonitrile-styrene copolymer, styrene-methyl methacrylate copolymer, polystyrene, poly(methyl methacrylate), polycarbonate, poly(phenylene oxide) and the like; and graft polymers in which on a polymer composed mainly of a repeating unit of an α-monoolefin of 2-8 carbon atoms is grafted other polymer, for example, a graft polymer obtained by grafting an acrylonitrile-styrene copolymer on an ethylene-propylene copolymer, a graft polymer obtained by grafting an acrylonitrile-styrene copolymer on an ethylene-butene copolymer, a graft polymer obtained by grafting butyl acrylate-methyl methacrylate copolymer on an ethylene-butene copolymer, a graft polymer obtained by grafting a methyl methacrylate copolymer on an ethylene-butene copolymer, a graft polymer obtained by grafting a methyl methacrylate polymer on an ethylene-glycidyl (meth)acrylate copolymer, a graft polymer obtained by grafting an acrylonitrile-styrene copolymer on an ethylene-glycidyl (meth)acrylate copolymer, and a graft polymer obtained by grafting an acrylonitrile-styrene copolymer on a hydrogenation product of a styrene-butadiene copolymer as disclosed in Japanese Patent Publication No. 63-32095. Of these thermoplastic resins, olefinic thermoplastic resins are preferable.

Also, polyamide resins, polyester resins, polycarbonates, polyamide elastomers, polyester elastomers, etc. are preferable as a component for improving the heat resistance of the resulting composition. They have excellent compatibility with Component (i'), in particular.

The rubbery polymer which is another component constituting Component (ii), refers to all of natural and synthetic rubbers. Typical examples of the rubbery polymer are styrene-butadiene random copolymer and its hydrogenation product; isoprene rubber, nitrile rubber and their hydrogenation products; chloroprene rubber, butyl rubber, ethylene-propylene rubber, ethylene-propylene-diene rubbers, ethylene-butene rubber, ethylene-butene-diene rubbers, acrylic rubbers, α,β-unsaturated nitrile-acrylic acid ester-conjugated diene copolymer rubbers, chlorinated polyethylene rubber, fluororubber, silicone rubber, urethane rubber, polysulfide rubber, styrene-butadiene block polymer and their hydrogenation products. Of these rubbery polymers, preferable are essentially saturated rubbers or rubbers of low unsaturation and modified rubbers obtained by adding a functional group to them, such as hydrogenation product of styrene-butadiene rubber; hydrogenation product of nitrile rubber; ethylene-propylene rubber; ethylene-propylene-diene rubbers; ethylene-butene rubber, ethylene-butene-diene rubbers; acrylic rubbers, chlorinated polyethylene rubber, fluororubber, silicone rubber, urethane rubber, polysulfide rubber, hydrogenation product of styrene-butadiene block polymer, and α,β-unsaturated nitrile-acrylic acid ester-conjugated diene copolymer rubber.

Elastomer Composition (I) comprises, as essential components, (i) a hydrogenated diene polymer or (i') a modified hydrogenated diene polymer and (ii) a thermoplastic resin and/or a rubbery polymer. The proportions of these components are 99-1 part by weight, preferably 95-5 parts by weight, more preferably 90-10 parts by weight of Component (i) or (i') and 1-99 parts by weight, preferably 5-95 parts by weight, more preferably 10-90 parts by weight of Component (ii) [(i) or (i')+(ii)=100 parts by weight].

When Component (i) or (i') is used in an amount of more than 99 parts by weight, the improvement of physical properties is insufficient. When Component (i) or (i') is used in an amount of less than 1 part by weight, various elastomeric properties are inferior. When Component (ii) is used in an amount of less than 1 part by weight, there is seen no improvement in physical properties due to the addition of Component (ii). When Component (ii) is used in an amount of more than 99 parts by weight, features of thermoplastic elastomer are lost.

Component (ii) used in this invention can vary over a wide range, because Component (i) or (i') which is a hydrogenated diene polymer (E-EB type TPE) varies over a wide range from a rubbery, very flexible form to a resinous hard form.

Accordingly, which of a thermoplastic resin, a rubbery polymer or both should be used as Component (ii), is determined mainly by the properties of Component (i) or (i') used and the properties of the composition to be obtained.

Specifically, when the content of Block C in Component (i) or (i') is not more than 40% by weight, Component (i) or (i') is usually rubbery and flexible; in this case, therefore, it is desirable that a thermoplastic resin be used as Component (ii) to obtain a thermoplastic elastomer composition balanced in properties.

Meanwhile, when the content of Block C in Component (i) or (i') is 60% by weight or more, Component (i) or (i') shows properties close to those of resin; in this case, accordingly, it is desirable that a rubbery polymer be used as Component (ii) to obtain an intended thermoplastic elastomer.

When the amount of Block C in Component (i) or (i') is more than 40% by weight but less than 60% by weight, it is desirable that a thermoplastic resin and a rubbery polymer be used in combination as Component (ii) to obtain a thermoplastic elastomer balanced in overall properties.

The above description on how to combine Component (i) or (i') and Component (ii) is merely a general description concerning the relationship between the properties of Component (i) or (i') and the type of polymer to be used as Component (ii). The composition of this invention is not restricted by the above description, and Component (ii) can be selected appropriately so as to provide a desired composition.

The polymer used as Component (ii) may be a mixture of a plurality of thermoplastic resins and/or a plurality of rubbery polymers.

When Component (ii) is a combination of a thermoplastic resin and a rubbery polymer, they can be used in any such proportions as to provide a final composition of desired properties.

Component (i), i.e. the hydrogenated diene polymer has an intrinsic property of functioning as a compatibilizing agent between different polymers; therefore, this property can be utilized in formulating the composition of this invention. It is known that when a block polymer is used as a compatibilizing agent, about several % by weight is sufficient as the amount used. In this invention, the minimum amount of Component (i) or (i') has been specified to be 1% by weight, in consideration of the role of Component (i) or (i') as a compatibilizing agent.

Therefore, when Component (i) or (i') is used as a compatibilizing agent, there are used, as Component (ii), a thermopalstic resin and a rubbery polymer in combination.

In order for Component (i) or (i') to effectively function as a compatibilizing agent, a particular thermoplastic resin and a particular rubbery polymer are selected and used in combination.

The thermoplastic resin includes, for example, polyolefin resins such as polyethylene, polypropylene, polybutene-1 and the like; and graft polymers in which on a polymer composed mainly of an α-monoolefin of 2-8 carbon atoms is grafted other polymer. The rubbery polymer includes, for example, monoolefin copolymer rubbers such as ethylene-propylene rubber, ethylene-propylene-diene rubbers, ethylene-butene rubber, ethylene-butene-diene rubbers and the like; chlorinated polyethylene rubber; hydrogenation product of styrene-butadiene rubber; hydrogenation product of nitrile rubber; and hydrogenation product of styrene-butadiene block polymer.

The above-mentioned combination of a particular thermoplastic resin and a particular rubbery polymer is a combination of polymers having a structure similar to a polyolefin structure which is the basic structure of the hydrogenated diene polymer of this invention.

Since the modified hydrogenated diene polymer of this invention has a functional group, it can act, owing to the chemical reaction between functional groups, as a compatibilizing agent for polymers which are ordinarily incompatible with polymers having a polyolefin structure. The thermoplastic resins which are incompatible with polyolefin resins and on which the modified hydrogenated diene polymer of this invention can effectively act as a compatibilizing agent, include polyamide resins such as nylon 4,6, nylon 6, nylon 6,6 and the like; polyester resins such as poly(ethylene terephthalate), poly(butylene terephthalate) and the like; polycarbonates; polyamide elastomers; polyester elastomers; and so forth.

The rubbery polymers incompatible with polyolefin resins include acrylic rubber, epichlorohydrin rubber, α,β-unsaturated nitrile-acrylic acid ester-unsaturated diene copolymer rubbers, urethane rubber, etc.

When Component (i) or (i') is used as a compatibilizing agent, there may be used other thermoplastic resins, and/or other rubbery polymers in addition to the above-mentioned resins and polymers.

In the thermoplastic elastomer compositions of this invention comprising Component (i) or (i') and Component (ii), when (1) Component (ii) comprises a rubbery polymer as an essential component, (2) a crosslinking agent for the rubbery polymer is incorporated, and (3) the composition is subjected to reaction while applying shear deformation, to allow at least 10% by weight of the rubbery polymer to gel, there can be obtained an elastomer composition [Elastomer Composition (II)] having excellent dynamic properties.

The crosslinking agent can be crosslinking agents ordinarily used in crosslinking of rubbers, i.e. those described in, for example, "Crosslinking Agents Handbook" (by Shinzo Yamashita and Tosuke Kaneko, published by Taiseisha).

The crosslinking agent is preferably sulfur; sulfur compounds; p-benzoquinone dioxime; p,p'-dibenzoylquinone dioxime; 4,4'-dithio-bis-dimorpholine; poly-p-dinitrosobenzene; tetrachlorobenzoquinone; resin crosslinking agents such as alkylphenol-formaldehyde resin, brominated alkylphenol-formaldehyde resin and the like; ammonium benzoate; bismaleimide compounds; diepoxy compounds; dicarboxylic acid compounds; diol compounds; diamine compounds; amino compounds; organometal salts; metal alkoxides; organometal compounds; organic peroxides; and so forth.

These crosslinking agents can be used alone or in admixture. Some crosslinking agents can be used in combination with other compounds to carry out crosslinking at a higher efficiency.

Specifically, when sulfur or a sulfur compound is used as a crosslinking agent, it is desirable to use, together with them, a vulcanization accelerator, an accelerator activator or an activating agent to accelerate the crosslinking reaction of sulfur. Appropriate combination, amounts used, etc. can be determined by referring to, for example, the above literature.

When an organic peroxide is used as a crosslinking agent, it is preferable to use therewith a crosslinking aid such as functional monomer or the like.

The selection of the crosslinking agent to be used is desirably made in thorough consideration of the properties of the rubbery polymer in Component (ii). The selection must be made by paying attention to the followings.

When the rubbery polymer in Component (ii) is highly unsaturated, there is selected a crosslinking agent effective to highly unsaturated rubbers, for example, a sulfur type, a resin crosslinking agent or the like, whereby the rubbery polymer can be predominantly crosslinked.

When the rubbery polymer in Component (ii) is an essentially saturated polymer, particularly an α-monoolefin copolymer rubber or a rubber of low unsaturation, thorough investigation is made on the amount of crosslinking agent used to enable crosslinking; in this case, however, there is a restriction that the crosslinking degree of the rubbery polymer cannot be made sufficiently high. As the method for basic solution thereto, there can be mentioned a method in which there is used, as the rubbery polymer, a rubbery polymer containing a functional group such as carboxyl group, acid anhydride group, hydroxyl group, epoxy group, halogen group, amino group, isocyanate group, sulfonyl group, sulfonate group or the like and further there is used, as the crosslinking agent, a compound reactive with the functional group. The functional group-containing rubbery polymer can be obtained, for example, by subjecting a functional group-containing monomer to copolymerization or by introducing a functional group into a rubbery polymer by a known graft reaction. The compound used as a crosslinking agent is a polyfunctional compound capable of effecting a substitution reaction with the functional group in the rubbery polymer and can be a low-molecular weight compound or a high-molecular, weight compound.

Specifically, a carboxyl group-containing rubbery polymer can be easily crosslinked by a diamino compound, bisoxazoline, a diepoxy compound, a diol compound or the like.

A diamino compound is an effective crosslinking agent for a maleic anhydride group-containing rubbery polymer.

A dithio compound or bismaleimide can be used as a crosslinking agent for a rubbery polymer having unsaturated portions.

A diamino compound is effective when the rubbery polymer is an acrylic rubber or a polymer composed mainly of an acrylic acid ester.

A dithiol compound is an effective crosslinking agent when the rubbery polymer is a chlorinated polymer (e.g. chlorinated polyethylene).

In Elastomer Composition (II) using Component (i'), the functional group added to the rubbery polymer may be the same as introduced into Component (i'). In this case, there may also occur crosslinking of Component (i') with the polyfunctional compound used as a crosslinking agent.

This, however, can be solved, for example, by reducing the amount of functional group in Component (i') or by adding an appropriate amount of the hydrogenated diene polymerized as a starting material for Component (i') (modified hydrogenated diene polymer).

The thus obtained Elastomer Composition (II) has a structure in which an appropriate amount of Component (i') has been grafted on a crosslinked rubbery polymer. Such a structure often shows highest dynamic properties and provides a preferable composition of this invention.

The amount of crosslinking agent used can be determined appropriately depending upon the properties required for desired final composition. The selection of appropriate crosslinking system and the determination of the amount are desirably made by referring to, for example, the above literature. Usually, there can be appropriately used a crosslinking agent in a range of 0.1-8 parts by weight per 100 parts by weight of the rubbery polymer, a vulcanization accelerator in a range of 0.1-10 parts by weight, an accelerator activator in a range of 0.5-10 parts by weight, an activating agent in a range of 0.5-10 parts by weight and a crosslinking aid in a range of 0.1-10 parts by weight. It is necessary that at least 10% by weight, preferably at least 30% by weight, more preferably at least 40% by weight, of the rubbery polymer used as Component (ii) has been allowed to gel. When the gelation degree of the rubbery polymer is less than 10% by weight, the improvement in dynamic properties due to crosslinking is insufficient.

The gel content of the rubbery polymer is taken as a gel content of a crosslinked rubbery polymer obtained by subjecting the rubbery polymer alone to the same crosslinking as applied in the preparation of Elastomer Composition (II). The gel content is determined usually by subjecting the above crosslinked rubbery polymer to extraction with cyclohexane at 70° C. for 4 hours, followed by calculation. When the rubbery polymer is insoluble in cyclohexane, a good solvent for the rubbery polymer is used.

In the thermoplastic elastomer composition of this invention comprising Component (i) or (i') and Component (ii), when Component (ii) comprises at least 10% by weight of a thermoplastic resin, there can be obtained an elastomer composition [Elastomer Composition (III)] having excellent dynamic properties, by subjecting Component (i) or (i') and Component (ii) to reaction in the presence of a crosslinking agent capable of crosslinking even Component (i) or (i'), while applying shear deformation, to allow at least 10% by weight of the total of the rubbery polymer and Component (i) or (i') to gel.

Elastomer Composition (III) can be obtained by subjecting Elastomer Composition (I) wherein Component (ii) comprises a thermoplastic resin in an amount of at least 10% by weight, to shear deformation (melt-mixing) in the presence of a compound capable of crosslinking Component (i) or (i') and a rubbery polymer as another component of Component (ii), to allow at least 10% by weight of the total of Component (i) or (i') and the rubbery polymer.

Thus, Elastomer Composition (III) is characterized by using Component (i) or (i') as a rubber component.

In Elastomer Composition (III), it is essential that a thermoplastic resin be used as Component (ii) in an amount of at least 10% by weight, preferably 10-80% by weight, more preferably 15-70% by weight. When the amount is less than 10% by weight, the resulting composition has no thermoplasticity and poor processability.

Preferable as the thermopalstic resin used in Elastomer Composition (III) are olefin-based crystalline thermoplastic polymers such as polyethylene, polypropylene, polybutene-1 and the like, and crystalline thermoplastic polymers such as polyamide, polyester, polyamide elastomer, polyester elastomer and the like.

Since in Elastomer Composition (III), Component (i) or (i') which is an essentially saturated olefin block copolymer, is used as a rubber component, the crosslinking agent is preferably a system consisting of an organic peroxide and a crosslinking aid.

The organic peroxide preferably has a one-minute half-life temperature of 150° C. or more. Such an organic peroxide includes, for example, 2,5-dimethyl-2,5-dibenzoylperoxyhexane, n-butyl 4,4-di-tert-butylperoxyvalerate, dicumyl peroxide, tert-butyl peroxybenzoate, di-tert-butylperoxy-di-isopropylbenzene, tert-butylcumyl peroxide, 2,5-dimethyl-2,5-di-tert-butylperoxyhexane, di-tert-butyl peroxide, and 2,5-dimethyl-2,5-di-tert-butylperoxyhexyne-3.

The crosslinking aid used is preferably a radical-polymerizable monomer or a radical-crosslinkable polymer. Such a crosslinking aid includes divinylbenzene, bismaleimide, trimethylolpropane triacrylate, trimethylolpropane methacrylate, pentaerythritol triacrylate, aluminum acrylate, aluminum methacrylate, zinc methacrylate, zinc acrylate, magnesium acrylate, magnesium methacrylate, triallyl isocyanurate, triallyl cyanurate, triallyl trimellitate, diallyl phthalate, diallyl chlorendate, liquid polybutadiene, liquid poly(1,2-butadiene), etc. These crosslinking aids can be used alone or in admixture of two or more.

Besides the crosslinking aid, there can be used a radical-accepting compound in combination. In this case, a composition of better properties can be obtained.

The radical-accepting compound is a compound which is rich in reactivity with free radical and accepts the free radical to act itself as a radical source or a compound which decomposes to generate a free radical. It includes sulfur, sulfur compounds, p-quinone derivatives, p-quinonedioxime derivatives, thiol group-containing compounds and the like which are preferably used. Specifically, preferred are sulfur, p-quinonedioxime, p,p'-dibenzoylquinonedioxime, hexafluoroisopropylidenebisphenol, dihydroxybenzophenone, hydroquinone, 2,4,6-trimercapto-S-triazine, dibenzothiazyl disulfide, tetramethylthiuram disulfide, dipentamethylenethiuram tetrasulfide and the like. These may be used alone or in admixture of two or more.

The amount of organic peroxide used is preferably 0.001-0.1 mole in terms of active oxygen amount, per 100 parts by weight of Component (i) or (i') or the total of Component (i) or (i') and other rubbery polymer. When the amount is less than 0.001 mole, there takes place no sufficient crosslinking. The use of organic peroxide in an amount of more than 0.1 mole gives no further crosslinking, is not economical, and tends to invite side reactions such as polymer decomposition and the like.

The crosslinking aid is used preferably in such an amount that the amount of unsaturated double bonds in crosslinking aid becomes ¼ to 40 equivalents per equivalent of the active oxygen in the organic peroxide used in combination. When the amount is less than ¼ equivalent, the improvement in crosslinking efficiency due to the addition of crosslinking aid is negligibly small and no sufficient crosslinking takes place. When the amount is more than 40 equivalents, no further crosslinking is obtained and such an amount is uneconomical.

In using the radical-accepting compound, the amount (mole) used is usually 1/20 to 2 equivalents per equivalent of the active oxygen in the organic peroxide used in combination. The use of the radical-accepting compound in an amount less than 1/20 equivalent shows no addition effect. The use in an amount of more than 2 equivalents gives no further effect, is uneconomical and, in some cases, invites significant reduction in crosslinking efficiency and produces local gelation.

The gel content in Component (i) or (i') or in Component (i) or (i') and rubbery polymer in Component (ii) is calculated using the method described with respect to Elastomer Composition (II).

Elastomer Composition (IV) of this invention is such a composition that in Elastomer Composition (I), Component (ii) is a polyolefin resin and that a nonaromatic process oil is contained as Component (iii).

Component (ii) in the Elastomer Composition (IV) is at least one resinous polymer selected from polyolefin resins. Preferable examples of Component (ii) are polypropylene, polyethylene, polymethylpentene and polybutene-1. The proportions of Component (i) or (i') and Component (ii) in Elastomer Composition (IV) are usually 10-90 parts by weight, preferably 20-80 parts by weight, more preferably 25-75 parts by weight of Component (i) or (i'), and usually 90-10 parts by weight, preferably 80-20 parts by weight, more preferably 75-25 parts by weight of Component (ii) [Component (i) or (i')+Component (ii)=100 parts by weight].

When the proportion of Component (i) or (i') is less than 10 parts by weight, the resulting composition has poor elasticity. When the proportion is more than 90 parts by weight, the resulting composition has low heat resistance.

Component (i) or (i') used in Elastomer Composition (IV) is particularly preferably a block copolymer consisting of 10-70% by weight of Block C and 90-30% by weight of Block D, the 1,2-vinyl content in Block C being 15% or less and the 1,2-vinyl content in Block D being 22-55%, or a modified hydrogenated diene polymer obtained by adding a functional group to the above block copolymer.

Component (iii) used in Elastomer Composition (IV) is a non-aromatic process oil. Preferable examples of the oil is a paraffinic process oil or a naphthenic process oil.

The amount of Component (iii) used is usually 1-300 parts by weight, preferably 5-200 parts by weight, more preferably 10-150 parts by weight per 100 parts by weight of the total of Component (i) or (i') and Component (ii).

When the amount is less than 1 part by weight, no softening effect is obtained. When the amount is more than 300 parts by weight, there occurs oil bleeding and significant reduction in strength.

Elastomer Composition (V) of this invention is obtained by subjecting Elastomer Composition (IV) to reaction in the presence of a component for crosslinking Component (i) or (i') contained in Elastomer Composition (IV), while applying shear deformation, to allow at least 10% by weight of Component (i) or (i') to gel. Elastomer Composition (V), as compared with Elastomer Composition (IV), is characterized by being superior to the latter in compression set, in particular.

As to the individual components constituting Elastomer Composition (V) and their appropriate amounts used, the same description as in Elastomer Composition (IV) applies. The component for crosslinking Component (i) or (i') used in Elastomer Composition (V) is preferably a system consisting of an organic peroxide, a crosslinking aid and a radical-accepting compound. Typical examples of such a system and the amount used are the same as described as to Elastomer Composition (III).

In Elastomer Composition (V), it is necessary that at least 10% by weight of Component (i) or (i') has been allowed to gel, and it is desirable that preferably at least 15% by weight, more preferably at least 20% by weight of Component (i) or (i') has been allowed to gel. When the gel content in Component (i) or (i') is less than 10% by weight, there is obtained no sufficient improvement in elasticity by crosslinking. The gel content is calculated by the method described as to Elastomer Composition (II).

Elastomer Composition (VI) comprises Component (i) or (i'), a polyolefin resin and an olefin copolymer rubber both as Component (ii), and a non-aromatic process oil as Component (iii).

Preferable examples of Component (i) or (i'), the polyolefin resin in Component (ii), and Component (iii) are the same as those described in Elastomer Composition (IV). Elastomer Composition (VI) is a combination of Elastomer Composition (IV) and an olefin copolymer rubber and is an elastomer composition of low hardness. The olefin copolymer rubber used in Component (ii) of Elastomer Composition (VI) is a rubbery polymer composed mainly of an olefin compound, and preferable examples of the olefin copolymer rubber are ethylene-propylene rubber, ethylene-propylene-diene rubber, ethylene-butene rubber, ethylene-butene-diene rubber, ethylene-acrylate rubber, chlorinated polyethylene, chlorosulfonated polyethylene, hydrogenation product of styrene-butadiene rubber, and hydrogenation product of nitrile rubber.

These olefin copolymer rubbers can be used alone or in admixture.

The amounts of the individual components used in Elastomer Composition (VI) are as follows. Component (i) or (i') are used in an amount of 5-95 parts by weight, preferably 15-85 parts preferably 20-80 parts by weight. When the amount is less than 5 parts by weight, the resulting composition has poor dynamic properties and insufficient strengths. When the amount is more than 95 parts by weight, the composition has reduced heat resistance in some cases.

The ratio of the polyolefin resin and the olefin copolymer rubber in Component (ii) is usually polyolefin resin/olefin copolymer rubber=10-90% by weight/90-10% by weight, preferably 15-85% by weight/85-15% by weight, more preferably 20-80% by weight/80-20% by weight.

When the polyolefin resin is less than 10% by weight and the olefin copolymer rubber is more than 90% by weight, the resulting composition has poor dynamic properties. When the polyolefin resin is more than 90% by weight and the olefin copolymer rubber is less than 10% by weight, the composition is insufficient in hardness (low hardness) because the content of the olefin copolymer rubber in the composition is too low.

The amount of Component (ii) used in Elastomer Composition (VI) is usually 95-5 parts by weight, preferably 85-15 parts by weight, more preferably 80-20 parts by weight [Component (i) or (i')+Component (ii) =100 parts by weight]. When the amount is more than 95 parts by weight, the resulting composition tends to have poor dynamic properties. When the amount is less than 5 parts by weight, the composition is insufficient in hardness (low hardness) and has reduced heat resistance.

The amount of Component (iii) used in Elastomer Composition (VI) is 1-400 parts by weight, preferably 5-300 parts by weight, more preferably 10-250 parts by weight per 100 parts by weight of the total of Component (i) or (i') and Component (ii). When the amount is less than 1 part by weight, no softening effect can be expected. When the amount is more than 400 parts by weight, oil bleeding and reduction in strength are striking.

Elastomer Composition (VII) is obtained by subjecting Elastomer Composition (VI) to reaction in the presence of a crosslinking agent for crosslinking the olefin copolymer rubber contained in Elastomer Composition (VI), while applying shear deformation, to allow at least 10% by weight of the olefin copolymer rubber to gel. Elastomer Composition (VII), as compared with Elastomer Composition (VI), is characterized by being superior to the latter, in dynamic strengths and compression set, in particular.

As to the individual components constituting Elastomer Composition (VII) and their appropriate amounts used, the same description as to Elastomer Composition (VI) applies. Preferable examples of the olefin copolymer rubber as part of Component (ii) are ethylene-propylene-diene rubber, ethylene-butene-diene rubber and partial hydrogenation products of these rubbers, all containing appropriate amounts of unsaturations in the molecule. As the crosslinking agent for crosslinking the olefin copolymer rubber as part of Component (ii), there are used those ordinarily used in crosslinking rubbers [they are described in detail as to Elastomer Composition (II)].

In Elastomer Composition (VII), there are preferably used sulfur type crosslinking agents, resin crosslinking agents (e.g. alkylphenol-formaldehyde resin), combinations of an organic peroxide and a crosslinking aid, described in detail as to Elastomer Composition (III), etc.

The amount of crosslinking agent used can be appropriately determined depending upon the properties required for the desired final composition. Specific examples are described in Elastomer Composition (II).

Preferable examples of the organic peroxide, crosslinking aid and radical-accepting compound and their amounts are the same as described as to Elastomer Composition (III).

In Elastomer Composition (VII), it is necessary that at least 10% by weight of the olefin copolymer rubber as part of Component (ii) has been allowed to gel, and it is desirable that preferably at least 40% by weight, more preferably at least 80% by weight of the olefin copolymer rubber has been allowed to gel. When the gel content in olefin copolymer rubber is less than 10% by weight, the resulting composition has low elasticity.

The gel content is calculated by the method described as to Elastomer Composition (II).

Elastomer Composition (VIII) is an elastomer composition which comprises, as essential components, Component (i) or (i') used in Elastomer Composition (I) and (ii) a component consisting of (A) an olefin polymer in or to which a carboxylic acid derivative and/or an epoxy derivative has been copolymerized or grafted, or a polymer obtained by bonding, to the olefin polymer, other polymer in a graft or block form, and (B) at least one polymer selected from the group consisting of polyamide polymers and polyester polymers, and which further comprises, as an optional component, 0–400 parts by weight, per 100 parts by weight of the total of Component (i) or (i') and the (ii) component, of (iii) a softening agent.

In Elastomer Composition (VIII), the (A) component of the (ii) component is used in order to improve the compatibility between the (B) component of the (ii) component and Component (i) or (i'), and is an olefin polymer having grafted thereon or copolymerized therewith a functional group-containing compound (e.g. carboxylic acid derivative and/or epoxy derivative) the olefin polymer having other polymer bonded thereto in a graft or block form.

Preferable examples of the carboxylic acid derivative in the (A) component are acrylic acid, methacrylic acid, maleic acid, itaconic acid, maleic anhydride and itaconic anhydride.

Preferable examples of the epoxy derivative are glycidyl acrylate, glycidyl methacrylate and allyl glydicyl ether.

The olefin polymer with or on which a carboxylic acid derivative and/or an epoxy derivative is to be copolymerized or grafted, includes a polymer composed mainly of an α-monoolefin of 2–4 carbon atoms, and a polymer obtained by hydrogenating a polymer composed mainly of a conjugated diene. Specific examples of the olefin polymer are polyethylene, polypropylene, propylene-ethylene copolymer, propylene-butene copolymer, hydrogenated polybutadiene and hydrogenated butadiene-styrene copolymer.

The said other polymer to be bonded in a graft or block form to the olefin polymer having copolymerized therewith or grafted thereon a carboxylic acid derivative and/or an epoxy derivative is used in order to control the reactivity of the functional group-containing compound or to control the miscibility. The type of the said other polymer is not critical, and there is appropriately used an acrylic polymer, a styrene polymer or the like.

Preferable examples of the (A) component are maleic anhydride-modified polyethylene, maleic anhydride-modified polypropylene, maleic anhydride-modified ethylene-propylene copolymer, ethylene-glycidyl methacrylate copolymer, allyl glycidyl ether-modified polyethylene, allyl glycidyl ether-modified polypropylene, allyl glycidyl ether-modified ethylene-propylene copolymer, ethylene-glycidyl methacrylate copolymer having grafted thereon poly(methyl methacrylate), ethylene-glycidyl methacrylate copolymer having grafted thereon polystyrene, and ethylene-glycidyl methacrylate copolymer having grafted thereon styrene-acrylonitrile copolymer.

The (B) component in the (ii) component is at least one polymer selected from the group consisting of polyamide polymers and polyester polymers. Preferable examples of the (B) component are polyamides such as nylon 6, nylon 6,6, nylon 4,6, nylon 11, nylon 12 and the like; thermoplastic polyamide elastomers; polyesters such as poly(ethylene terephthalate), poly(butylene terephthalate) and the like; and thermoplastic polyester elastomers.

The proportions of the (A) component and the (B) component in the (ii) component are such that the (A) component is usually 0.5–50% by weight, preferably 0.5–40% by weight, more preferably 0.5–30% by weight. When the proportion of the (A) component in the (ii) component is less than 0.5% by weight, the improvement in miscibility is insufficient. When the proportion is more than 50% by weight, no further effect is obtained and such a proportion is uneconomical.

Elastomer Composition (VIII) essentially comprising the (A) component and the (B) component as to (ii) component, may further contain other compound (e.g. rubbery compound) as the (ii) component. The use of rubbery compound is effective to reduce composition hardness, and accordingly is convenient for providing a soft composition.

In using the rubbery compound as the (ii) component, the properties of the rubbery compound are not critical, but it is advantageous that the (ii) component comprises at least 10% by weight, preferably 15% by weight, more preferably 20% by weight of the (B) component.

When the proportion of the (B) component is less than 10% by weight, the addition of rubbery compound reduces the heat reduction of composition in some cases. The rubbery compound can be crosslinked as necessary.

Crosslinking of rubbery compound can be effected by, after the addition of the rubbery compound, adding a crosslinking agent during kneading and then carrying out crosslinking dynamically. Alternatively, there can be used a rubbery compound appropriately crosslinked beforehand. Crosslinking of rubbery compound is preferable because it tends to improve the compression set of the composition.

The proportions of Component (i) or (i') and the (ii) component in Elastomer Composition (VIII) are usually 5–95 parts by weight [Component (i) or (i')]/95–5 parts by weight [the (ii) component], preferably 10–90 parts by weight/90–10 parts by weight, more preferably 15–85 parts by weight/85–15 parts by weight [Component (i) or (i')+the (ii) component=100 parts by weight]. When Component (i) or (i') is less than 5 parts by weight and the (ii) component is more than 95 parts by weight, the resulting composition is hard and poor in flexibility. When Component (i) or (i') is more than 95% by weight and the (ii) component is less than 5 parts by weight, the composition has insufficient heat resistance.

As the softening agent (iii) used in Elastomer Composition (VIII), there is used a plasticizer for polyamide or polyester, or a non-aromatic process oil.

As the plasticizer, there are preferably used a phthalic acid ester, a trimellitic acid ester, a phosphoric acid ester, etc. As the non-aromatic process oil, there are preferably used a paraffinic oil and a naphthenic oil. The softening agent (iii) is optionally used when it is necessary to allow Elastomer Composition (VIII) to have a low hardness. It is used in an amount of usually 0–400 parts by weight, preferably 5–300 parts by weight, more preferably 10-250 parts by weight per 100 parts by weight of the total of Component (i) or (i') and the (ii) component. When it is used in an amount of more than 400 parts by weight, bleeding of softening agent and reduction in composition strength are striking.

Thermoplastic Elastomer Composition (I) to (VIII) of this invention can comprise, as necessary, various additives, for example, stabilizers such as antioxidant, heat stabilizer, ultraviolet absorber, copper harm preventing agent and the like, inorganic fillers such as silica, talc, carbon, calcium carbonate, magnesium carbonate, glass fiber and the like, and organic fillers such as wood flour, cork powder, cellulose powder, rubber powder and the like.

Thermoplastic Elastomer Compositions (I) to (III) can further comprise a softening agent such as plasticizer, oil or the like.

In producing the thermoplastic elastomer composition of this invention, there can be used a conventional kneading apparatus, for example, a batchwise kneading apparatus (e.g. rubber mill, Bradender mixer, Banbury mixer, pressure kneader), or a continuous kneading apparatus (e.g. single screw extruder, twin screw extruder). From the standpoint of productivity, there is most preferred a system enabling continuous production, i.e. a twin screw extruder or a combination of a batchwise kneading apparatus and a twin screw extruder.

In the actual kneading by twin screw extruder, all components are kneaded at one time, or some components are kneaded and the remaining components are added in the middle. When a liquid softening agent is used in a large amount, it is desirable to add the softening agent under pressure in the middle of extruder after the solid components have been melted. When it is necessary to add a softening agent and a crosslinking agent in the middle of the extruder, their addition order is not critical but, to reduce the increase in load caused by crosslinking, it is desirable to add the crosslinking agent after addition of the softening agent under pressure.

The thermoplastic elastomer composition of this invention is a novel composition using E-EB type TPE which is intrisically an excellent thermoplastic elastomer and yet which has not been put into practical application, and can satisfy various industrial requirements.

The modified hydrogenated diene polymer of this invention has an olefin structure but has excellent compatibility with polyamides, polyesters, etc. Accordingly, compositions having excellent properties can be obtained by blending the above polymer with various other polymers.

Specific examples of the application of the thermoplastic elastomer composition of this invention include parts for automobiles and vehicles, such as skin material for interior parts, rack-and-pinion boot, bellows, vacuum connector, tube, side body molding, head rest, regulator, arm rest, shift lever boot, weather strip, air spoiler, suspension boot, belt cover, wheel cover, nob, bumper, site shield, bumper molding and the like; industrial parts such as hydraulic hose, air tube, rubber hose, out-cover, various gaskets, container, O-ring, packing material, key board material and the like; color tiles; floor material; furnitures; skin material for household electric appliances; vibration insulators; and sporting goods such as skin material for grip and the like.

Also, the thermoplastic elastomer composition of this invention is an excellent shape memory resin and can be used as mechanical parts, joint material, etc.

This invention is described in more detail below referring to Examples. However, this invention is not restricted to these Examples.

In the Examples, parts and % are by weight unless otherwise specified.

In the Examples, tensile strength, elongation at break, elongation set at 100% extension, compression set and hardness were measured in accordance with JIS K 6301. Gel content of rubber was measured by the above-mentioned method.

EXAMPLES 1-10 AND COMPARATIVE EXAMPLES 1-4 [EXAMPLES ON ELASTOMER COMPOSITIONS (I) TO (III)]

(i) A hydrogenated diene polymer and (ii) a thermoplastic polymer and/or a rubbery polymer were fed into a laboratory plastomill controlled at 190° C., in accordance with the compounding recipe shown in Table 1, and were mixed at 80 rpm for 10 minutes. The mixture was taken out and made into a sheet on a heated roll. The sheet was press-molded to prepare a square sheet of 10 cm×10 cm. The sheet was cut by a dumbbell cutter to prepare test pieces for measurement.

When a crosslinking agent was used, it was added after confirming the complete melting of the (i) component and the (ii) component. After the addition of the crosslinking agent, mixing at 80 rpm was continued up to 3 minutes after the torque meter fit to the laboratory plastomill had showed a maximum shaft torque; then, the mixture was taken out. In most cases, the time from addition of crosslinking agent to taking-out of mixture was 20 minutes or less.

The results are shown in Table 1.

In Table 1, Examples 1-5 are on Elastomer Compositions (I) of this invention; Examples 7-8 are on Elastomer Compositions (II) of this invention; and Examples 9-10 are on Elastomer Compositions (III) of this invention. It is appreciated that each of these Elastomer Compositions was a composition showing the excellent properties of the hydrogenated diene polymer (i).

In contrast, Comparative Examples 1-2 are on compositions using no hydrogenated diene polymer; and these compositions had a low elongation at break, a high hardness and a low elongation set.

Comparative Example 3 is on the (i) component alone; and it had a low strength at break and was not practical.

Comparative Example 3 is on a composition using, as the (i) component, a hydrogenated styrene/butadiene/styrene block copolymer (SEBS, Kraton G1650); and the composition was inferior in elongation, compression set, etc.

EXAMPLES 11-14 AND COMPARATIVE EXAMPLES 5-7 [EXAMPLES ON ELASTOMER COMPOSITIONS (IV)]

A composition of pellet form was prepared in accordance with the compounding recipe shown in Table 2, using a twin screw extruder of L/D=32.5 (PCM-45 manufactured by Ikegai Seisakusho K.K.). The pellets were injection-molded to prepare a square sheet of 10 cm×10 cm. The sheet was cut by a dumbbell cutter to prepare test pieces for measurement. In the preparation of the composition in the twin screw extruder, Component (i) and Component (ii) were dry-blended; the blend was passed through the extruder; and Component (iii) was pressure-fed into the middle of the extruder in a state that said blend was a uniform melt. The results are shown in Table 2.

As is clear from Table 2, the Elastomer Compositions (IV) of this invention are elastomers having a low hardness, excellent elasticity and excellent dynamic properties.

In contrast, Comparative Example 5 is on a composition containing a softening agent in an amount larger than specified; and the composition showed severe oil bleeding and was unable to mold. Comparative Examples 6–7 are on compositions using Kraton G1650 in place of the Component (i) of this invention; and these compositions had a hardness and dynamic properties about equal to those of the Elastomer Compositions of this invention, but had a low compression set and accordingly were unsuited for use as an elastomer.

EXAMPLES 15–18 AND COMPARATIVE EXAMPLES 8–10 [EXAMPLES ON ELASTOMER COMPOSITIONS (V)]

A composition of pellet form was prepared in accordance with the compounding recipe shown in Table 3, using a twin screw extruder (TEX-44 manufactured by Nippon Seiko K.K.). The pellets were injection-molded to prepare a square sheet of 10 cm×10 cm. The sheet was cut by a dumbbell cutter to prepare test pieces for measurement. In the preparation of the composition in the twin screw extruder, Component (i), Component (ii) and a crosslinking aid were dry-blended; the blend was passed through the extruder; and pressure feeding of Component (iii) and addition of a crosslinking agent (an organic peroxide) were effected at the middle of the extruder in a state that said blend was a uniform melt. Incidentally, the order of the pressure feeding of Component (iii) and the addition of the crosslinking agent is not critical. The results are shown in Table 3.

As is clear from Table 3, the Elastomer Compositions (V) of this invention were improved in compression set, in particular and accordingly were improved in elastomer properties. In contrast, Comparative Example 8 is on a composition containing a crosslinking agent in an amount larger than specified; and the composition showed severe gelation of Component (i) and was unable to injection-mold. Comparative Examples 9–10 are on compositions using Kraton G1650 in place of the Component (i) of this invention; and the compositions had a hardness and dynamic properties about equal to those of the Elastomer Compositions of this invention, but were insufficient in improvement of compression set.

EXAMPLES 19–22 AND COMPARATIVE EXAMPLES 11–13 [EXAMPLES ON ELASTOMER COMPOSITIONS (VI)]

A composition of pellet form was prepared in accordance with the compounding recipe shown in Table 4, using a twin screw extruder (PCM-45 manufactured by Ikegai Seisakusho K.K.). The pellets were injection-molded to prepare a square sheet of 10 cm×10 cm. The sheet was cut by a dumbbell cutter to prepare test pieces for measurement. In the preparation of the composition in the twin screw extruder, Component (i) and Component (ii) were dry-blended; the blend was passed through the twin screw extruder; and Component (iii) was pressure-fed into the middle of the extruder in a state that said blend was a uniform melt. The results are shown in Table 4.

As is clear from Table 4, the Elastomer Compositions (VI) of this invention had a very low hardness and a sufficient compression set, and accordingly were suited for use as an elastomer.

In contrast, Comparative Example 11 is on a composition containing an oil in an amount larger than specified; and the composition gave severe oil bleeding and was unable to mold. Comparative Examples 12–13 are on compositions using Kraton G1650 in place of the Component (i) of this invention; and the compositions had a hardness and dynamic properties about equal to those of the Elastomer Compositions of this invention, but had a low compression set and accordingly were unsuited for use as an elastomer.

EXAMPLES 23–26 AND COMPARATIVE EXAMPLES 14–16 [EXAMPLES ON ELASTOMER COMPOSITIONS (VI)]

A composition of pellet form was prepared in accordance with the compounding recipe shown in Table 5, using a twin screw extruder (TEX-44 manufactured by Nippon Seiko K.K.). The pellets were injection-molded to prepare a square sheet of 10 cm×10 cm. The sheet was cut by a dumbbell cutter to prepare test pieces for measurement.

The results are shown in Table 5. As is clear from Table 5, the Elastomer Compositions (VII) of this invention were elastomer compositions of extremely low hardness as not seen in conventional thermoplastic elastomers and were excellent in dynamic properties and compression set, in particular.

In contrast, Comparative Example 14 is on a composition containing a softening agent in an amount larger than specified; and the composition caused severe oil bleeding. Comparative Example 15 is on a composition containing no Component (i); and the composition had poor dynamic properties and was unsuited for practical use. Comparative Example 16 is on a composition using Kraton G1650 in place of the Component (i) of this invention; and the composition had dynamic properties and a hardness about equal to those of the Elastomer Compositions of this invention, but had a low compression set.

EXAMPLES 27–30 AND COMPARATIVE EXAMPLES 17–19 [EXAMPLES ON ELASTOMER COMPOSITIONS (VI)]

A composition of pellet form was prepared in accordance with the compounding recipe shown in Table 6, using a twin screw extruder (PCM-45 manufactured by Ikegai Seisakusho K.K.). The pellets were injection-molded to prepare a square sheet of 10 cm×10 cm. The sheet was cut by a dumbbell cutter to prepare test pieces for measurement.

The results are shown in Table 6. As is clear from Table 6, the Elastomer Compositions (VIII) of this invention had excellent dynamic properties and an excellent compression set.

In contrast, Comparative Example 17 is on a composition containing no Component (A) and had poor dynamic properties.

Comparative Examples 18–19 are on compositions using Kraton G1650 in place of Component (i); and the compositions had dynamic properties about equal to those of the Elastomer Compositions of this invention, but had a low compression set and were unsuited as an elastomer.

TABLE 1

| | Example | | | | | | | | | | Comparative Example | | | |
|---|---|---|---|---|---|---|---|---|---|---|---|---|---|---|
| | 1 | 2 | 3 | 4 | 5 | 6 | 7 | 8 | 9 | 10 | 1 | 2 | 3 | 4 |
| Compounding recipe | | | | | | | | | | | | | | |
| Component (i) | | | | | | | | | | | | | | |
| Type | BL-1[*5] | BL-1[*5] | BL-1[*5] | BL-2[*9] | BL-1[*5] | BL-2[*9] | BL-2[*9] | BL-2[*9] | BL-3[*14] | BL-3[*14] | — | — | BL-2[*9] | SEBS[*15] |
| parts | 60 | 60 | 40 | 90 | 5 | 80 | 70 | 60 | 70 | 40 | — | — | 100 | 60 |
| Component (ii) | | | | | | | | | | | | | | |
| Thermoplastic resin | | | | | | | | | | | | | | |
| Type | PE[*6] | PP[*7] | PP[*7] | EA[*10] | PP[*7] | — | — | PE[*6] | PP[*7] | PP[*7] | PE[*6] | PP[*7] | — | PP[*7] |
| Parts | 40 | 40 | 30 | 10 | 40 | — | — | 10 | 30 | 30 | 40 | 40 | — | 40 |
| Rubbery polymer | | | | | | | | | | | | | | |
| Type | — | — | EBM[*8] | — | EPR[*11] | EPDM[*12] | MAH-EP[*13] | EPDM[*12] | — | EPR[*11] | EMB[*8] | EPR[*11] | — | — |
| Parts | — | — | 30 | — | 55 | 20 | 30 | 30 | — | 30 | 60 | 60 | — | — |
| Crosslinking Agent | | | | | | | | | | | | | | |
| Sulfur | — | — | — | — | — | 0.4 | — | 0.5 | — | — | — | — | — | — |
| BBS[*1] | — | — | — | — | — | 0.2 | — | 0.25 | — | — | — | — | — | — |
| MBTS[*2] | — | — | — | — | — | 0.2 | — | 0.25 | — | — | — | — | — | — |
| Triethyltetramine | — | — | — | — | — | — | 1.0 | — | — | — | — | — | — | — |
| t-BPO[*3] | — | — | — | — | — | — | — | — | 1.0 | 1.0 | — | — | — | — |
| TAC[*4] | — | — | — | — | — | — | — | — | 1.2 | 1.2 | — | — | — | — |
| Physical properties | | | | | | | | | | | | | | |
| Tensile strength (Kg/cm²) | 110 | 150 | 100 | 250 | 140 | 240 | 200 | 200 | 190 | 140 | 100 | 110 | 50 | 232 |
| Elongation at break (%) | 800 | 910 | 750 | 800 | 820 | 880 | 860 | 860 | 700 | 750 | 340 | 140 | 1,000 | 210 |
| Elongation set at 100% extension (%) | 33 | 36 | 37 | 13 | 34 | 14 | 12 | 11 | 13 | 16 | 45 | 56 | 10 | 45 |
| Hardness (JIS A) | 85 | 88 | 75 | 75 | 86 | 72 | 69 | 72 | 68 | 65 | 95 | 96 | 66 | 98 |
| Gel content of rubber (%) | — | — | — | — | — | 90 | 90 | 92 | 90 | 93 | — | — | — | — |

TABLE 1'

| | 1,2-Vinyl content in Block C (%) | 1,2-Vinyl content in Block D (%) | Number-average molecular weight C/D/C (× 10³) | Hydrogenation degree (%) |
|---|---|---|---|---|
| *5 | 12 | 45 | 30/140/30 | 98 |
| *9 | 13 | 80 | 60/120/60 | 97 |
| *14 | 10 | 56 | 25/200/25 | 98 |

Note:
- *1 N-tert-butyl-2-benzothiazolesulfenamide
- *2 Bis-benzothiazyl disulfide
- *3 Di-tert-butyl peroxide
- *4 Triallyl cyanurate
- *5 A hydrogenated diene polymer shown in Table 1'
- *6 ZF-51, a polyethylene manufactured by Mitsubishi Petrochemical Co., Ltd.
- *7 MA-7, a polypropylene manufactured by Mitsubishi Petrochemical Co., Ltd.
- *8 2041P, an ethylene-butene rubber manufactured by Japan Synthetic Rubber Co., Ltd.
- *9 A hydrogenated diene polymer shown in Table 1'
- *10 A graft polymer obtained by grafting an acrylonitrile-styrene random copolymer onto an ethylene-butene copolymer
- *11 EP02P manufactured by Japan Synthetic Rubber Co., Ltd.
- *12 EP57P manufactured by Japan Synthetic Rubber Co., Ltd.
- *13 An ethylene-propylene copolymer rubber grafted with 2% of maleic anhydride
- *14 A hydrogenated diene polymer shown in Table 1'
- *15 Kraton G1650 manufactured by Shell.

TABLE 2'

| | 1,2-Vinyl content in Block C (%) | 1,2-Vinyl content in Block D (%) | Number-average molecular weight C/D/C (× 10³) | Hydrogenation degree (%) |
|---|---|---|---|---|
| *16 | 12 | 35 | 45/210/45 | 98 |
| *17 | 12 | 33 | 75/350/75 | 98 |
| *18 | 13 | 40 | 60/180/60 | 98 |

Note:
- *16, *17 and *18: Hydrogenated diene polymers shown in Table 2'
- *19 A polymethylpentene manufactured by Mitsui Petrochemical Industries, Ltd.
- *20 A paraffinic oil manufactured by Idemitsu Petrochemical
- *21 Measured under conditions of 70° C. × 22 hours

TABLE 2

| | Example 11 | Example 12 | Example 13 | Example 14 | Comparative Example 5 | Comparative Example 6 | Comparative Example 7 |
|---|---|---|---|---|---|---|---|
| Compounding recipe | | | | | | | |
| Component (i) | | | | | | | |
| Type | BL-4*16 | BL-5*17 | BL-6*18 | BL-6*18 | BL-4*16 | SEBS*15 | SEBS*15 |
| Parts | 60 | 60 | 70 | 80 | 60 | 60 | 70 |
| Component (ii) | | | | | | | |
| Thermoplastic resin | | | | | | | |
| Type | PP*7 | TPX*19 | PP*7 | PP*7 | PP*7 | PP*7 | PP*7 |
| Parts | 40 | 40 | 30 | 20 | 40 | 40 | 30 |
| Rubbery polymer | | | | | | | |
| Type | — | — | — | — | — | — | — |
| Parts | — | — | — | — | — | — | — |
| Component (iii) | | | | | | | |
| Softening agent | | | | | | | |
| Type | PW-90*20 | PW-90*20 | PW-90*20 | PW-90*20 | PW-90*20 | PW-90*20 | PW-90*20 |
| Parts | 70 | 70 | 50 | 100 | 350 | 70 | 50 |
| Physical properties | | | | | | | |
| Tensile strength (Kg/cm²) | 240 | 230 | 260 | 180 | Molding was impossible due to oil bleading. | 210 | 190 |
| Elongation at break (%) | 750 | 680 | 800 | 950 | | 640 | 750 |
| Compression set (%)*21 | 45 | 42 | 45 | 40 | | 75 | 80 |
| Hardness (JIS A) | 80 | 83 | 78 | 60 | | 80 | 77 |

TABLE 3

| | Example 15 | Example 16 | Example 17 | Example 18 | Comparative Example 8 | Comparative Example 9 | Comparative Example 10 |
|---|---|---|---|---|---|---|---|
| Compounding recipe | | | | | | | |
| Component (i) | | | | | | | |
| Type | BL-4*16 | BL-5*17 | BL-6*18 | BL-6*18 | BL-4*16 | SEBS*15 | SEBS*15 |
| Parts | 60 | 60 | 70 | 70 | 60 | 60 | 70 |
| Component (ii) | | | | | | | |
| Thermoplastic resin | | | | | | | |
| Type | PP*7 | PP*7 | PP*7 | PP*7 | PP*7 | PP*7 | PP*7 |
| Parts | 40 | 40 | 30 | 30 | 40 | 40 | 30 |
| Rubbery polymer | | | | | | | |
| Type | — | — | — | — | — | — | — |
| Parts | — | — | — | — | — | — | — |
| Component (iii) | | | | | | | |
| Type | PW-90*20 | PW-90*20 | PW-90*20 | PW-90*20 | PW-90*20 | PW-90*20 | PW-90*20 |
| Parts | 70 | 70 | 30 | 100 | 70 | 70 | 100 |
| Crosslinking agent | | | | | | | |
| Kayahexa AD*22 | 0.4 | 0.4 | 0.5 | 0.5 | 5 | 0.4 | 0.5 |
| BMI*23 | 0.7 | 0.7 | 0.8 | 0.8 | 10 | 0.7 | 0.8 |
| HQ*24 | 0.05 | 0.05 | 0.06 | 0.06 | 1 | — | — |
| Physical properties | | | | | | | |
| Tensile strength (Kg/cm²) | 270 | 290 | 280 | 200 | Moldability | 230 | 200 |

TABLE 3-continued

|  | Example 15 | Example 16 | Example 17 | Example 18 | Comparative Example 8 | Comparative Example 9 | Comparative Example 10 |
|---|---|---|---|---|---|---|---|
| Elongation at break (%) | 640 | 600 | 650 | 700 | was poor. | 560 | 550 |
| Compression set (%)*21 | 32 | 31 | 30 | 30 |  | 53 | 50 |
| Hardness (JIS A) | 82 | 83 | 79 | 62 |  | 84 | 79 |
| Gel content of rubber (%)*25 | 35 | 40 | 35 | 38 |  | 40 | 38 |

Note:
*7Same as in Note of Table 1
*8Same as in Note of Table 1
*16-*21as in Note of Table 2
*222,5-Dimethyl-2,5-di(tert-butylperoxy)hexane manufactured by Kayaku Noury Co., Ltd.
*23Bismaleimide
*24Hydroquinone
*25Cyclohexane gel content

TABLE 4

|  | Example 19 | Example 20 | Example 21 | Example 22 | Comparative Example 11 | Comparative Example 12 | Comparative Example 13 |
|---|---|---|---|---|---|---|---|
| Compounding recipe | | | | | | | |
| Component (i) | | | | | | | |
| Type | BL-4*16 | BL-5*17 | BL-6*18 | BL-6*18 | BL-4*16 | SEBS*15 | SEBS*15 |
| Parts | 40 | 40 | 40 | 40 | 40 | 40 | 40 |
| Component (ii) | | | | | | | |
| Thermoplastic resin | | | | | | | |
| Type | PP*7 | PP*7 | PP*7 | PP*7 | PP*7 | PP*7 | PP*7 |
| Parts | 20 | 20 | 20 | 20 | 20 | 20 | 20 |
| Rubbery polymer | | | | | | | |
| Type | EPDM*26 | EPDM*26 | EPDM*26 | EPDM*26 | EPDM*26 | EPDM*26 | EPDM*26 |
| Parts | 40 | 40 | 40 | 40 | 40 | 40 | 40 |
| Component (iii) | | | | | | | |
| Type | PW-90*20 | PW-90*20 | PW-90*20 | PW-90*20 | PW-90*20 | PW-90*20 | PW-90*20 |
| Parts | 100 | 150 | 200 | 250 | 500 | 100 | 200 |
| Physical properties | | | | | | | |
| Tensile strength (Kg/cm²) | 100 | 80 | 60 | 40 | Molding was impossible due to oil bleeding. | 85 | 40 |
| Elongation at break (%) | 800 | 850 | 900 | 1,000 |  | 700 | 900 |
| Compression set (%)*21 | 50 | 48 | 43 | 41 |  | 80 | 85 |
| Hardness *JIS A) | 50 | 40 | 30 | 20 |  | 50 | 30 |

Note:
*7Same as in Note of Table 1
*15Same as in Note of Table 1
*16-*18 & *20-*21Same as in Note of Table 2
*26EP98A manufactured by Japan Synthetic Rubber Co., Ltd.

TABLE 5

|  | Example 23 | Example 24 | Example 25 | Example 26 | Comparative Example 14 | Comparative Example 15 | Comparative Example 16 |
|---|---|---|---|---|---|---|---|
| Compounding recipe | | | | | | | |
| Component (i) | | | | | | | |
| Type | BL-4*16 | BL-5*17 | BL-6*18 | BL-6*18 | BL-4*16 | — | SEBS*15 |
| Parts | 40 | 40 | 40 | 40 | 40 | — | 40 |
| Component (ii) | | | | | | | |
| Thermoplastic resin | | | | | | | |
| Type | PP*7 | PP*7 | PP*7 | PP*7 | PP*7 | PP*7 | PP*7 |
| Parts | 20 | 20 | 20 | 20 | 20 | 40 | 20 |
| Rubbery polymer | | | | | | | |
| Type | EPDM*26 | EPDM*26 | EPDM*26 | EPDM*26 | EPDM*26 | EPDM*26 | EPDM*26 |
| Parts | 40 | 40 | 40 | 40 | 40 | 60 | 40 |
| Component (iii) | | | | | | | |
| Type | PW-90*20 | PW-90*20 | PW-90*20 | PW-90*20 | PW-90*20 | PW-90*20 | PW-90*20 |
| Parts | 100 | 150 | 200 | 250 | 500 | 150 | 200 |
| Crosslinking agent | | | | | | | |
| Kayahexa AD*22 | 2.0 | 2.0 | — | 2.5 | 2.0 | 2.5 | 2.0 |
| BMI*23 | 3.0 | 3.0 | — | 4.0 | 3.0 | 4.0 | 3.0 |
| HQ*24 | 0.4 | 0.4 | — | 0.5 | 0.4 | 0.6 | 0.4 |
| SP1045*27 | — | — | 6.0 | — | — | — | — |
| SnCl₂2H₂O | — | — | 0.5 | — | — | — | — |
| Physical properties | | | | | | | |
| Tensile strength (Kg/cm²) | 140 | 110 | 85 | 65 | Molding was impossible due to oil | 15 | 65 |
| Elongation at break (%) | 650 | 680 | 700 | 750 |  | 500 | 600 |
| Compression set (%)*21 | 28 | 27 | 26 | 26 |  | 35 | 45 |
| Hardness (JIS A) | 53 | 42 | 30 | 21 |  | 45 | 28 |

TABLE 5-continued

|  | Example 23 | Example 24 | Example 25 | Example 26 | Comparative Example 14 | Comparative Example 15 | Comparative Example 16 |
|---|---|---|---|---|---|---|---|
| Gel content of rubber (%)*25 | 90 | 90 | 95 | 98 | bleeding. | 98 | 90 |

Note:
*7Same as in Note of Table 1
*15Same as in Note of Table 1
*16-*18 & *20-*21Same as in Note of Table 2
*22-*25Same as in Note of Table 3
*26Same as in Note of Table 4
*27A vulcanizing agent of resin, manufactured by Nihon Shokubai Kagaku Kogyo Co., Ltd.

TABLE 6

|  |  | Example 27 | Example 28 | Example 29 | Example 30 | Comparative Example 17 | Comparative Example 18 | Comparative Example 19 |
|---|---|---|---|---|---|---|---|---|
| Compounding recipe |  |  |  |  |  |  |  |  |
| Component (i) | Type | BL-4*16 | BL-5*17 | BL-6*18 | BL-6*18 | BL-4*16 | SEBS*15 | SEBS*15 |
|  | Parts | 60 | 70 | 50 | 40 | 60 | 50 | 40 |
| Component (ii) |  |  |  |  |  |  |  |  |
| Component (A) | Type | PE-MAH*28 | A4200*29 | PP-MAH*30 | A4200*29 | — | PP-MAH*30 | A4200*29 |
|  | Parts | 10 | 10 | 5 | 5 | — | 5 | 5 |
| Component (B) | Type | PA6*31 | PBT*32 | TAPE*33 | TPEE*34 | PA6*31 | TAPE*33 | TAPE*33 |
|  | Parts | 30 | 20 | 45 | 45 | 40 | 45 | 45 |
| Rubbery polymer | Type | — | — | — | EPDM*26 | — | — | EPDM*26 |
|  | Parts | — | — | — | 10 | — | — | 10 |
| Physical properties |  |  |  |  |  |  |  |  |
| Tensile strength (Kg/cm$^2$) |  | 350 | 360 | 300 | 260 | 120 | 280 | 240 |
| Elongation at break (%) |  | 650 | 530 | 600 | 650 | 100 | 560 | 600 |
| Compression set (%)*21 |  | 55 | 50 | 45 | 45 | 55 | 75 | 78 |
| Hardness (JIS A) |  | 98 | 95 | 93 | 90 | 98 | 93 | 90 |

Note:
*15-18 & *21Same as in Note of Table 1
*26Same as in Note of Table 4
*28Maleic anhydride-modified polyethylene
*29Modiper A4200 manufactured by Nippon Oils and Fats Co., Ltd.
*30Maleic anhydride-modified polypropylene
*31Nylon 6
*32Poly(butylene terephthalate)
*33Polyamide elastomer
*34Polyester elastomer

EXAMPLES 31-33 (PREPARATION OF MODIFIED HYDROGENATED DIENE POLYMERS)

A modified hydrogenated diene polymer was prepared in accordance with the compounding recipe shown in Table 7, and made into test pieces in the same manner as in Example 1.

The test pieces were used for measurement of physical properties in accordance with JIS K 6301. The results are shown in Table 7.

EXAMPLES 34-48 AND COMPARATIVE EXAMPLES 10-11 (PREPARATION OF MODIFIED HYDROGENATED DIENE POLYMERS OR THERMOPLASTIC POLYMER COMPOSITIONS)

Test pieces were prepared in the same manner as in Example 1, using the compounding recipe shown in Table 7.

The test pieces were used for measurement of physical properties in accordance with JIS K 6301. The results are shown in Table 7.

In Table 7, Examples 31-33 and 41-44 are Examples for preparing the modified hydrogenated diene polymers of this invention, and Examples 34-40 and 45-48 are Examples for preparing the thermoplastic polymer compositions of this invention. Each of these polymers and compositions had excellent physical properties.

Comparative Example 10 is on a composition using a hydrogenated styrene/butadiene/styrene block polymer to which 3% of maleic anhdyride has been added; and the composition had dynamic properties about equal to those of the compositions of this invention, but had a high melt viscosity and accordingly poor processability.

Comparative Example 11 is on the maleic anhydride-modified SEBS itself, used in Comparative Example 10; and the modified SEBS had physical properties about equal to those of the modified hydrogenated diene polymers of this invention, but had drawbacks of SEBS as mentioned in Comparative Example 10, i.e. high melt viscosity and poor processability.

The hydrogenated block polymers BL-1, BL-2 and BL-3 used in some of the Examples were prepared as follows.

BL-1 was prepared according to the following procedure. Into a 10-liter autoclave were fed 4,800 g of dry cyclohexane and 180 g of purified butadiene. Thereinto was injected, as a polymerization catalyst, about 4.5 cm$^3$ of a hexane solution containing 14% of n-butyllithium, in a high purity nitrogen current. The mixture was subjected to polymerization at 70° C. for 1 hour. The reaction mixture was cooled to 50° C., and 1,700 ppm of THF and 420 g of purified butadiene were added. The mixture was subjected to polymerization at 70°-80° C. for 1 hour. Then, 4.9 cm$^3$ of a 11% methyldichlorosilane solution was added to subject the polymer to coupling. 30 cm$^3$ of a 10% di-tert-butyl-p-cresol solution, 10 ml of a 14% n-butyllithium solution, 0.3 g of diethyldichlorotitanium and 8 cm$^3$ of a 15% diethylchloroaluminum chloroaluminum solution were added at 70° C., and hydrogen gas of 10 kg/cm$^2$ was passed therethrough with sufficient stirring. After about 2 hours of hydrogenation reaction, the contents in the autoclave were taken out, subjected to steam stripping, and roll-dried to obtain BL-1.

BL-2 and BL-3 were prepared in accordance with the above procedure.

The properties of BL-1, BL-2 and BL-3 are shown in Table 8.

TABLE 7

| | | Example 31 | Example 32 | Example 33 | Example 34 | Example 35 | Example 36 | Example 37 |
|---|---|---|---|---|---|---|---|---|
| Materials used for preparation of Component (i) (parts) | | | | | | | | |
| Hydrogenated block polymer | Type | BL-1*5 | BL-2*9 | BL-3*14 | — | — | — | — |
| | Amount | 100 | 100 | 100 | — | — | — | — |
| Functional group-containing monomer | Type | GAE*35 | PAB*36 | MA*37 | — | — | — | — |
| | Amount | 3 | 3 | 3 | — | — | — | — |
| Organic peroxide | Type | t-BPO*38 | t-BPO*38 | t-BPO*38 | — | — | — | — |
| | Amount | 0.2 | 0.2 | 0.2 | — | — | — | — |
| Compounding recipe of composition (parts) | | | | | | | | |
| Component (i) | Type | — | — | — | 1 | 1 | 2 | 3 |
| | Amount | — | — | — | 60 | 70 | 30 | 5 |
| Component (ii) | | | | | | | | |
| Thermoplastic resin | Type | — | — | — | PA12*43 | PBT*44 | PA12*43 | PA12*43 |
| | Amount | — | — | — | 40 | 30 | 30 | 50 |
| Rubbery polymer | Type | — | — | — | — | — | EPDM*45 | EPDM*45 |
| | Amount | — | — | — | — | — | 40 | 45 |
| Compound recipe of crosslinking agent (parts) | | | | | | | | |
| Vulcanizing agent for resin*39 | | — | — | — | — | — | 1.0 | 1.0 |
| SnCl2 dihydrate | | — | — | — | — | — | 0.2 | 0.2 |
| PBO*40 | | — | — | — | — | — | — | 0.5 |
| tert-PBO*38 | | — | — | — | — | 0.8 | — | — |
| TAC*41 | | — | — | — | — | 1.0 | — | — |
| BMI*42 | | — | — | — | — | — | — | — |
| Physical properties | | | | | | | | |
| Tensile strength (Kg/cm²) | | 230 | 160 | 70 | 300 | 310 | 240 | 200 |
| Elongation at break (%) | | 1,000 | 1,000 | 1,000 | 450 | 440 | 480 | 400 |
| Elongation set at 100% extension (%) | | 11 | 8 | 5 | 20 | 33 | 25 | 30 |
| Hardness (JIS A) | | 88 | 75 | 66 | 94 | 100 | 88 | 92 |
| Retention of tensile strength at 80° C. (%) | | 40 | 35 | 25 | 70 | 70 | 65 | 75 |

| | | Example 38 | Example 39 | Example 40 | Comparative Example 10 | Example 41 | Example 42 | Example 43 |
|---|---|---|---|---|---|---|---|---|
| Materials used for preparation of Component (i) (parts) | | | | | | | | |
| Hydrogenated block polymer | Type | — | — | — | — | BL-2*9 | BL-2*9 | BL-2*9 |
| | Amount | — | — | — | — | 100 | 100 | 100 |
| Functional group-containing monomer | Type | — | — | — | — | MDMAE*49 | MAH*50 | HEMA*51 |
| | Amount | — | — | — | — | 4 | 3 | 4 |
| Organic peroxide | Type | — | — | — | — | t-BPO*38 | t-BPO*38 | t-BPO*38 |
| | Amount | — | — | — | — | 0.3 | 0.2 | 0.2 |
| Compounding recipe of composition (parts) | | | | | | | | |
| Component (i) | Type | 1 | 1 | 3 | SEBS*48 | — | — | — |
| | Amount | 40 | 40 | 80 | 60 | — | — | — |
| Component (ii) | | | | | | | | |
| Thermoplastic resin | Type | TPEE*46 | TPAE*47 | TPEE*46 | PA12*13 | — | — | — |
| | Amount | 60 | 60 | 20 | 40 | — | — | — |
| Rubbery polymer | Type | — | — | — | — | — | — | — |
| | Amount | — | — | — | — | — | — | — |
| Compound recipe of crosslinking agent (parts) | | | | | | | | |
| Vulcanizing agent for resin*39 | | — | — | — | — | — | — | — |
| SnCl2 dihydrate | | — | — | — | — | — | — | — |
| PBO*40 | | — | — | — | — | — | — | — |
| tert-PBO*38 | | — | 0.8 | — | — | — | — | — |
| TAC*41 | | — | — | — | — | — | — | — |
| BMI*42 | | — | 1.0 | — | — | — | — | — |
| Physical properties | | | | | | | | |
| Tensile strength (Kg/cm²) | | 160 | 240 | 140 | 320 | 165 | 155 | 163 |
| Elongation at break (%) | | 780 | 530 | 1,000 | 420 | 850 | 900 | 950 |
| Elongation set at 100% extension (%) | | 18 | 23 | 19 | 21 | 8 | 8 | 8 |
| Hardness (JIS A) | | 90 | 95 | 84 | 100 | 75 | 76 | 75 |
| Retention of tensile strength at 80° C. (%) | | 75 | 75 | 55 | 65 | 36 | 34 | 35 |

| | | Example 44 | Example 45 | Example 46 | Example 47 | Example 48 | Comparative Example 11 |
|---|---|---|---|---|---|---|---|
| Materials used for preparation of Component (i) (parts) | | | | | | | |
| Hydrogenated block polymer | Type | BL-2*9 | — | — | — | — | SEBS*48 |
| | Amount | 100 | — | — | — | — | 100 |
| Functional group-containing | Type | Cl-ST*52 | — | — | — | — | — |

TABLE 7-continued

| | | | | | | | |
|---|---|---|---|---|---|---|---|
| monomer | Amount | 4 | — | — | — | — | — |
| Organic peroxide | Type | t-BPO*38 | — | — | — | — | — |
| | Amount | 0.3 | — | — | — | — | — |
| Compounding recipe of composition (parts) | | | | | | | |
| Component (i) | Type | — | 1 | 2 | 13 | 14 | — |
| | Amount | — | 60 | 60 | 60 | 40 | — |
| Component (ii) | | | | | | | |
| Thermoplastic resin | Type | — | PA12*43 | PA12*43 | TPAE*47 | PP*53 | — |
| | Amount | — | 40 | 40 | 40 | 20 | — |
| Rubbery polymer | Type | — | — | — | — | Cl-PE*54 | — |
| | Amount | — | — | — | — | 40 | — |
| Compound recipe of crosslinking agent (parts) | | | | | | | |
| Vulcanizing agent for resin*39 | | — | — | — | — | — | — |
| SnCl$_2$ dihydrate | | — | — | — | — | — | — |
| PBO*40 | | — | — | — | — | — | — |
| tert-PBO*38 | | — | — | — | — | — | — |
| TAC*41 | | — | — | — | — | — | — |
| BMI*42 | | — | — | — | — | — | — |
| Physical properties | | | | | | | |
| Tensile strength (Kg/cm$^2$) | | 163 | 250 | 270 | 185 | 180 | 300 |
| Elongation at break (%) | | 880 | 460 | 490 | 780 | 600 | 450 |
| Elongation set at 100% extension (%) | | 8 | 22 | 21 | 18 | 16 | 6 |
| Hardness (JIS A) | | 76 | 95 | 95 | 92 | 86 | 85 |
| Retention of tensile strength at 80° C. (%) | | 35 | 72 | 75 | 70 | 55 | 35 |

Note:
*5, *9 and *14 Same as in Note of Table 1
*35 Allyl glycidyl ether
*36 N-(p-carboxyphenylmaleimide)
*37 Maleic acid
*38 Di-tert-butyl peroxide
*39 An alkylphenol-formaldehyde resin
*40 Bisoxazoline
*41 Triallyl isocyanurate
*42 Bismaleimide
*43 Rilsan AMNO, a nylon 12 manufactured by Toray Industries Incorporated
*44 Toray PBT 1401-X06, a poly(butylene terephthalate) manufactured by Toray Industries Incorporated
*45 JSR EP57P, an ethylene-propylene rubber manufactured by Japan Synthetic Rubber Co., Ltd.
*46 PIBIFLEX 46 CM, a polyester elastomer manufactured by Dutral
*47 Grilux A-250, a polyamide elastomer manufactured by DAINIPPON INK & CHEMICALS, INC.
*48 A modified SEBS obtained by grafting Kraton G1650 manufactured by Shell K. K. with 3% of maleic anhydride
*49 Dimethylaminoethyl methacrylate
*50 Maleic anhydride
*51 Hydroxyethyl methacrylate
*52 p-Chlorostyrene
*53 Polypropylene (MA-7)
*54 Chlorinated polyethylene rubber

What is claimed is:

1. A thermoplastic elastomer composition comprising: 99–1 parts by weight of (i) a hydrogenated diene polymer which is a hydrogenation product of a straight or branched chain block copolymer consisting of (C) a polybutadiene block segment having a 1,2-vinyl content of not more than 20% and (D) a block segment which is a polybutadiene or an alkenyl aromatic compound-butadiene copolymer, the butadiene portion of which has a 1,2-vinyl content of 25–95%, the block structure of said straight or branched chain block copolymer being represented by the formula, C-D-C or (C-D)$_m$-X in which C means the above-mentioned polybutadiene block segment (C), D means the above-mentioned block segment (D), X means a coupling residue and m means an integer of 3 or more, at least 90% of the double bonds in the butadiene portion of the straight or branched chain block copolymer having been hydrogenated, or (i') a modified hydrogenated diene polymer in which 0.01 to 10 mole % of at least one functional group selected from the group consisting of carboxyl group, acid anhydride group, hydroxyl group, epoxy group, halogen atom and amino group is added to the hydrogenated diene polymer (i), and 1–99 parts by weight of (ii) at least one member selected from the group consisting of a thermoplastic resin and a rubber polymer.

2. The thermoplastic elastomer composition according to claim 1, wherein component (ii) is a rubbery polymer and at least 10% of the rubbery polymer has been allowed to gel by subjecting a mixture of component (i) or (i'), component (ii) and a crosslinking agent for component (ii) to reaction while applying shear deformation to the mixture.

3. The thermoplastic elastomer composition according to claim 1, wherein component (ii) is a mixture of at least 10% by weight of the thermoplastic resin and the rubbery polymer, and at least 10% by weight of a total amount of component (i) or (i') and the rubbery polymer has been allowed to gel by subjecting component (i) or (i') and component (ii) to reaction in the presence of a crosslinking agent while applying shear deformation to them.

4. The thermoplastic elastomer composition according to claim 1, wherein the amount of component (i) or (i') is 10–90 parts by weight and component (ii) is 90–10 parts by weight of a polyolefin resin, and which further contains (iii) a non-aromatic process oil in a proportion of 1–300 parts by weight per 100 parts by weight of a total amount of component (i) or (i') and component (ii).

5. The thermoplastic elastomer composition according to claim 4, wherein at least 10% by weight of component (i) or (i') has been allowed to gel by subjecting component (i) or (i'), component (ii) and component (iii) to reaction in the presence of a crosslinking agent for component (i) or (i') while applying shear deformation to them.

6. The thermoplastic elastomer composition according to claim 1, wherein the amount of component (i) or (i′) is 5-95 parts by weight and component (ii) is 95-5 parts by weight of a mixture consisting of 10-90% weight of a polyolefin resin and 90-10% by weight of an olefinic copolymer rubber and which further contains (iii) a non-aromatic process oil in a proportion of 1-400 parts by weight per 100 parts by weight of a total of component (i) or (i′) and component (ii).

7. The thermoplastic elastomer composition according to claim 6, wherein at least 10% by weight of the olefinic copolymer rubber of component (ii) has been allowed to gel by subjecting component (i) or (i′), component (ii) and component (iii) to reaction in the presence of a crosslinking agent for the olefinic copolymer rubber while applying shear deformation to them.

8. The thermoplastic elastomer composition according to claim 1, wherein the amount of component (i) or (i′) is 5-95 parts by weight and component (ii) is 95-5 parts by weight of (A) an olefinic polymer having graft-copolymerized thereon at least one member selected from the group consisting of a carboxylic acid derivative and an epoxy derivative or the olefinic polymer having bonded thereto another polymer in the graft or block form and (B) at least one member selected from the group consisting of a polyamide polymer and a polyester polymer and which further contains (iii′) a softening agent in a proportion of 0-400 parts by weight per 100 parts by weight of a total of component (i) or (i′) and component (ii).

* * * * *